US012531811B2

(12) United States Patent
Majjiga

(10) Patent No.: US 12,531,811 B2
(45) Date of Patent: Jan. 20, 2026

(54) SYSTEMS AND METHODS FOR QUALITY OF SERVICE TREATMENT OF NETWORK TRAFFIC FOR DIFFERENT USER INTERFACE ELEMENTS

(71) Applicant: Verizon Patent and Licensing Inc., Basking Ridge, NJ (US)

(72) Inventor: Deepak Majjiga, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 92 days.

(21) Appl. No.: 18/401,878

(22) Filed: Jan. 2, 2024

(65) Prior Publication Data

US 2025/0219952 A1 Jul. 3, 2025

(51) Int. Cl.
*H04L 47/2441* (2022.01)
*G06F 3/0481* (2022.01)

(52) U.S. Cl.
CPC ........ *H04L 47/2441* (2013.01); *G06F 3/0481* (2013.01)

(58) Field of Classification Search
CPC .......................... H04L 47/2441; G06F 3/0481
USPC ....................................................... 709/238
See application file for complete search history.

(56) References Cited

U.S. PATENT DOCUMENTS

| 9,195,572 | B2 * | 11/2015 | Rossi | G06F 16/9566 |
| 9,218,105 | B2 * | 12/2015 | Månsson | G06F 3/04847 |
| 2001/0027490 | A1 * | 10/2001 | Fodor | H04W 76/12 |
| | | | | 709/238 |
| 2006/0119601 | A1 * | 6/2006 | Finlayson | G06T 19/003 |
| | | | | 345/427 |
| 2013/0159890 | A1 * | 6/2013 | Rossi | G06F 9/451 |
| | | | | 715/762 |
| 2018/0292958 | A1 * | 10/2018 | Martinez | G06F 3/0484 |
| 2021/0409730 | A1 * | 12/2021 | Wang | H04N 19/172 |
| 2024/0015568 | A1 * | 1/2024 | Bhatia | H04W 28/0967 |
| 2024/0121184 | A1 * | 4/2024 | Raghuvanshi | H04L 45/3065 |

* cited by examiner

*Primary Examiner* — Wing F Chan
*Assistant Examiner* — John Fan

(57) ABSTRACT

A device described herein may maintain a model associating sets of traffic attributes with respective sets of attributes of user interface ("UI") elements; receive a request to associate a particular UI element with a particular set of Quality of Service ("QoS") parameters; identify a first set of attributes of the particular UI element; identify that the first set of attributes, of the particular UI element, matches a second set of attributes of UI elements included in the model; and identify a particular set of traffic attributes indicated in the model as being associated with the second set of attributes of UI element attributes. The device may identify traffic associated with the particular set of traffic attributes; and may process the identified traffic in accordance with the particular set of QoS parameters indicated in the request, based on identifying that the traffic is associated with the particular set of traffic attributes.

20 Claims, 15 Drawing Sheets

SYSTEMS AND METHODS FOR QUALITY OF SERVICE TREATMENT OF NETWORK TRAFFIC FOR DIFFERENT USER INTERFACE ELEMENTS

BACKGROUND

Wireless networks may be used for the wireless transmission of various applications and/or types of traffic, such as voice call traffic, messaging traffic, audio and/or video streaming traffic, file download traffic, and/or other types of traffic. Different types of traffic may have different Quality of Service ("QoS") requirements, routing rules, or the like. For example, voice call traffic may have lower latency requirements than file download traffic, and file download traffic may have higher throughput requirements than voice call traffic. Some applications may be associated with different user interface ("UI") elements that trigger the communication of different types of traffic. For example, one UI element (e.g., button, tab, etc.) of a web browser application may be used for cloud gaming sessions, another UI element of the web browser application may be used for video conferencing sessions, and so on.

DETAILED DESCRIPTION OF EXAMPLE EMBODIMENTS

The following detailed description refers to the accompanying drawings. The same reference numbers in different drawings may identify the same or similar elements.

Embodiments described herein provide for QoS treatment of traffic associated with network applications executing at a User Equipment ("UE"), such as a mobile telephone, a tablet, a laptop computer, etc. Specifically, for example, embodiments described herein provide for the same application to be associated with different types or classes of traffic, for which different QoS treatment may be provided by one or more networks that receive, carry, route, etc. such traffic. For example, while some network applications may be specifically configured to request particular QoS parameters, other network applications may not be configured to request such parameters. A developer of a given network application may, for instance, not be aware of particular QoS parameters, or the network applications may be general-purpose applications (e.g., web browsers) that may be used for multiple different traffic types or services (e.g., voice call services, video conferencing services, cloud gaming services, augmented reality ("AR") services, etc.). Further, a user of an application may desire to specifically request particular QoS parameters for certain types of traffic or services associated with the application, without requesting such QoS parameters for all traffic associated with the application.

Figure 1:
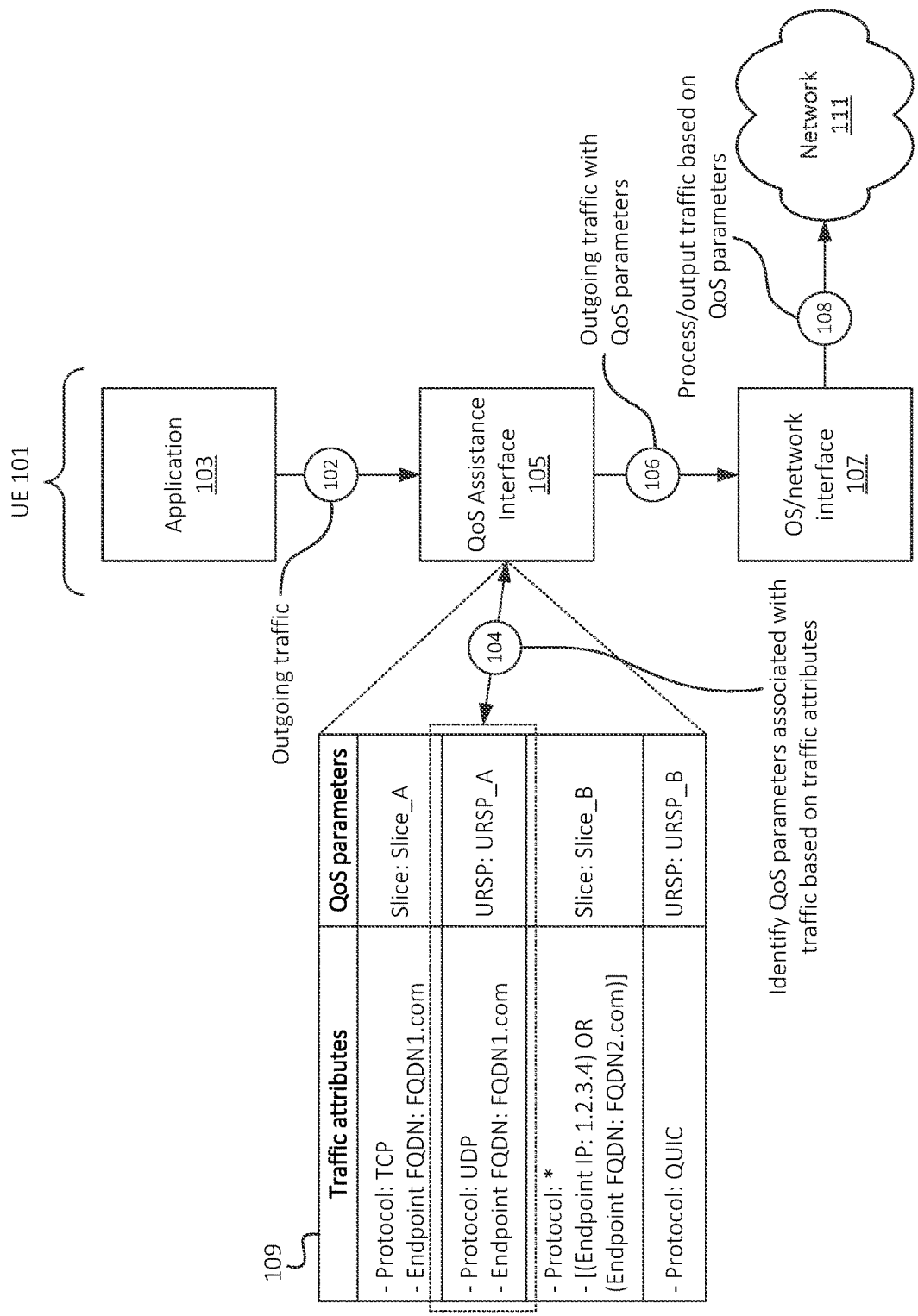
FIGS. 1 and 2 illustrate an example overview of one or more embodiments described herein.

As shown in FIG. 1, for example, a particular UE 101 may include (e.g., execute, run, etc.) one or more applications 103. Applications 103 may include applications that communicate with one or more other devices, systems, networks, etc. in order to provide a particular user experience or service at UE 101, such as voice call services, gaming services, etc. In accordance with some embodiments, UE 101 may also include, implement, etc. QOS Assistance Interface ("QAI") 105. In some embodiments, QAI 105 may be, may include, may implement, etc. an application programming interface ("API"), a protocol, or the like, via which application 103 may specify attributes of traffic flows associated with application 103. A given traffic flow associated with application 103, as discussed herein, may refer to an endpoint, such as another device or system (e.g., another UE 101, an application server, or the like), with which application 103 communicates.

As one example, application 103 may include a web browser application with multiple tabs or windows. As another example, application 103 may include a desktop or mobile application with multiple widgets or other types of discrete UI elements. As yet another example, some of the operations or functionality described below with respect to applications 103 may be applicable to features of an operating system or native operating environment of a given UE 101, such as file explorer windows, system level notification windows or buttons, or other such features. In accordance with embodiments described herein, application 103 may associate each tab or window with a particular traffic flow. For example, a user of UE 101 may use application 103 to navigate to a first website (e.g., a first website via which a particular service is provided, such as a video conferencing service, a gaming service, etc.) in a first tab, and may further navigate to a second website (e.g., a second website via which a different service is provided) in a second tab. For each tab, application 103 may output (at 102) a request to establish a new traffic flow. In FIG. 1, the request is shown as being provided by application 103 to QAI 105. In some embodiments, application 103 may not "directly" communicate with QAI 105. For example, in such embodiments, application 103 may output such requests to OS/network interface 107, which may forward such requests to QAI 105 in order to ultimately determine QoS parameters for the requested traffic flows.

As another example, application 103 may include multiple buttons, display areas, or other UI elements that correspond to different services, types of traffic, etc. For example, one button in a UI of application 103 may be associated with a first service (e.g., receiving streaming video content), while another button in the UI of application 103 may be associated with a second service (e.g., sending or receiving audio or video as part of a videoconference). For each UI element (e.g., for each of the buttons mentioned above), application 103 may output (at 102) a request to QAI 105 to establish a new traffic flow. In the example of FIG. 1, the establishment of a single traffic flow is shown; in practice, some or all of the operations shown in FIG. 1 may be performed multiple times, in order to provide for multiple flows with multiple different QoS parameters to be established for the same particular application 103.

Application 103 may, for example, output (at 102) the new traffic flow request to QAI 105, which may be an application installed and/or executing on UE 101. Additionally, or alternatively, application 103 may include an API that is implemented by an operating system ("OS") or other component of UE 101, and application 103 may output (at 102) the new traffic flow request to the OS (e.g., OS/network interface 107) in accordance with a format, protocol, etc. specified by such API. Such request may include a request to establish a network connection, a request to establish a traffic flow, etc.

As shown, QAI 105 may include, may interface with, may look up, and/or may otherwise be associated with data structure 109. In some embodiments, data structure 109 may include a mapping between traffic attributes (e.g., attributes of traffic associated with a flow request) and particular QoS parameters. In this manner, traffic having different attributes (e.g., associated with different endpoints, protocols, and/or other attributes) may be associated with different QoS parameters, and different types of traffic sent and/or received by application 103 may be treated according to such QoS parameters without requiring application 103 to request such QoS parameters specifically. For example, as discussed above, a developer or provider of application 103 may not need to specify QoS parameters associated with application 103, at least by virtue of the operations performed by QAI 105 in accordance with some embodiments, as discussed herein.

As shown, for example, data structure 109 may include information associating particular sets of traffic attributes with particular QoS parameters. Traffic attributes may include, for example, a protocol associated with the traffic, locator information (e.g., a Fully Qualified Domain Name ("FQDN"), an Internet Protocol ("IP") address, a Uniform Resource Locator ("URL"), etc.) of an endpoint with which the traffic is associated, and/or other traffic attributes. In some embodiments, the traffic attributes may include a name or other identifier of a particular service or type of service (e.g., an indication that particular traffic is voice call traffic, gaming traffic, etc., or is associated with a particular voice call service, gaming service, etc.), and/or other suitable traffic attributes. In some embodiments, the traffic attributes may include an application identifier, a Service Level Agreement ("SLA") or minimum performance thresholds (e.g., minimum bandwidth, maximum latency, etc.), and/or other suitable information. In some embodiments, the traffic attributes may be the same information, or same type of information, that is included in header information of respective traffic (e.g., in an IP header or other type of header). In some embodiments, the traffic attributes may be, may include, and/or may be based on one or more traffic descriptors.

The QoS parameters, included in data structure 109, may include an identifier of a particular network slice (e.g., where a wireless network may provide differentiated QoS treatment to traffic associated with different network slices), an identifier of one or more UE Route Selection Policy ("URSP") rules, a QoS class identifier, and/or other suitable QoS parameters. In this example, data structure 109 includes both slice identifiers (represented by example slice identifiers "Slice_A" and "Slice_B") and URSP rules (represented by example URSP rule identifiers "URSP_A" and "URSP_B"). In some embodiments, the slice identifiers and/or URSP rules may be represented by other identifiers. For example, slice identifiers may include Network Slice Selection Assistance Information ("NSSAI") values or other slice identifying values. In practice, data structure 109 may include only one type of QoS parameter (e.g., only URSP rules, only slice identifiers, etc.) and/or may include other types of QoS parameters than those shown here.

Data structure 109 may indicate, for example, that traffic flows associated with a Transmission Control Protocol ("TCP") protocol and an endpoint with the example FQDN "FQDN1.com" are associated with Slice_A, and that traffic flows associated with a User Datagram Protocol ("UDP") protocol and the same endpoint FQDN "FQDN1.com" are associated with URSP_A. That is, different QoS parameters may apply to traffic flows associated with the same FQDN, but with different protocols. In some embodiments, the attributes may be specified with one or more logical operators, conditions, criteria, regular expressions, etc. For instance, data structure 109 indicates that traffic associated with any protocol (as denoted by the "*" character or some other wildcard indicator), as well as with an endpoint having the IP address 1.2.3.4 or the FQDN "FQDN2.com" is associated with Slice_B.

In some embodiments, the information included in data structure 109 may specify sets or types of traffic attributes. For example, as noted above, one set of traffic attributes, specified in data structure 109, may include an endpoint IP address, while other sets of traffic attributes may not include an endpoint IP address. Further, in some embodiments, in lieu of including a wildcard character (e.g., "Protocol: *" as discussed above), data structure 109 may omit such criteria. For example, in lieu of including the attribute "Protocol: *", data structure 109 may omit the "Protocol" field entirely for that particular record of data structure 109, where such omission may be interpreted (e.g., by QAI 105) the same as if a wildcard character were included. For example, as further shown in data structure 109, traffic flows associated with the QUIC protocol and any endpoint (e.g., as denoted by the lack of an "endpoint" field in the associated record of data structure 109) may be associated with URSP_B.

In some embodiments, the information associating particular traffic attributes to particular QoS parameters (e.g., data structure 109) may be received from a network operator (e.g., an operator of network 111), a provisioning system that registers or provisions UE 101 with network 111, a user of network 111, and/or some other suitable source. As discussed below, certain traffic attributes may be associated with particular UI elements of application 103 and/or other applications, such that a user may select traffic associated with such UI elements to be associated with particular QoS parameters.

QAI 105 may accordingly identify (at 104) the associated QoS parameters for the traffic flow requested (at 102) by application 103. In some embodiments, the request (at 102) may specify the particular traffic attributes associated with the requested flow. As discussed above, the attributes of the traffic may include header information or other information that is associated with the traffic flow, such as a particular protocol, endpoint, etc. In this sense, application 103 may not necessarily need to be "aware" of QAI 105 or of the differential QoS treatment of traffic associated with different UI elements of application 103.

Once QAI 105 determines (at 104) the QoS parameters associated with the flow request, QAI 105 may forward (at 106) the flow request, along with an indication of the identified QoS parameters, to OS/network interface 107. OS/network interface 107 may, for example, provide access to processor resources, network resources, memory resources, storage resources, and/or other resources of UE 101 to application 103. OS/network interface 107 may facilitate communications between UE 101 (e.g., communications associated with one or more applications 103 and one or more networks, such as network 111.

Based on the received (at 106) flow request and indication of the identified QoS parameters (e.g., slice identifier, URSP rule identifier, etc.), OS/network interface 107 may process and/or output (at 108) traffic, associated with the requested flow, to network 111 based on the QoS parameters. In some embodiments, for example, OS/network interface 107 may communicate with network 111 to establish one or more communication sessions, such as protocol data unit ("PDU") sessions and/or other types of sessions, between UE 101 and network 111. Such communication sessions may be established according to the identified QoS parameters, such that network 111 performs QoS treatment (e.g., applies queue priority, resource allocations, SLAs, Data Network Names ("DNNs"), routing parameters, etc.) commensurate with the identified QoS parameters. In some embodiments, OS/network interface 107 may queue, prioritize, etc. traffic associated with the flow according to the QoS parameters. For example, OS/network interface 107 may prioritize, queue, etc. the traffic associated with the flow, as compared to traffic associated with other flows, based on respective QoS parameters associated with the flows.

Although the examples herein are described in the context of "flows," similar operations may be performed without specific requests to establish or utilize traffic flows. For example, application 103 may proceed to output traffic to OS/network interface 107 for forwarding to network 111, and OS/network interface 107 may communicate with QAI 105 to determine different QoS parameters for traffic having different attributes (e.g., traffic associated with different UI elements of application 103).

Figure 2:
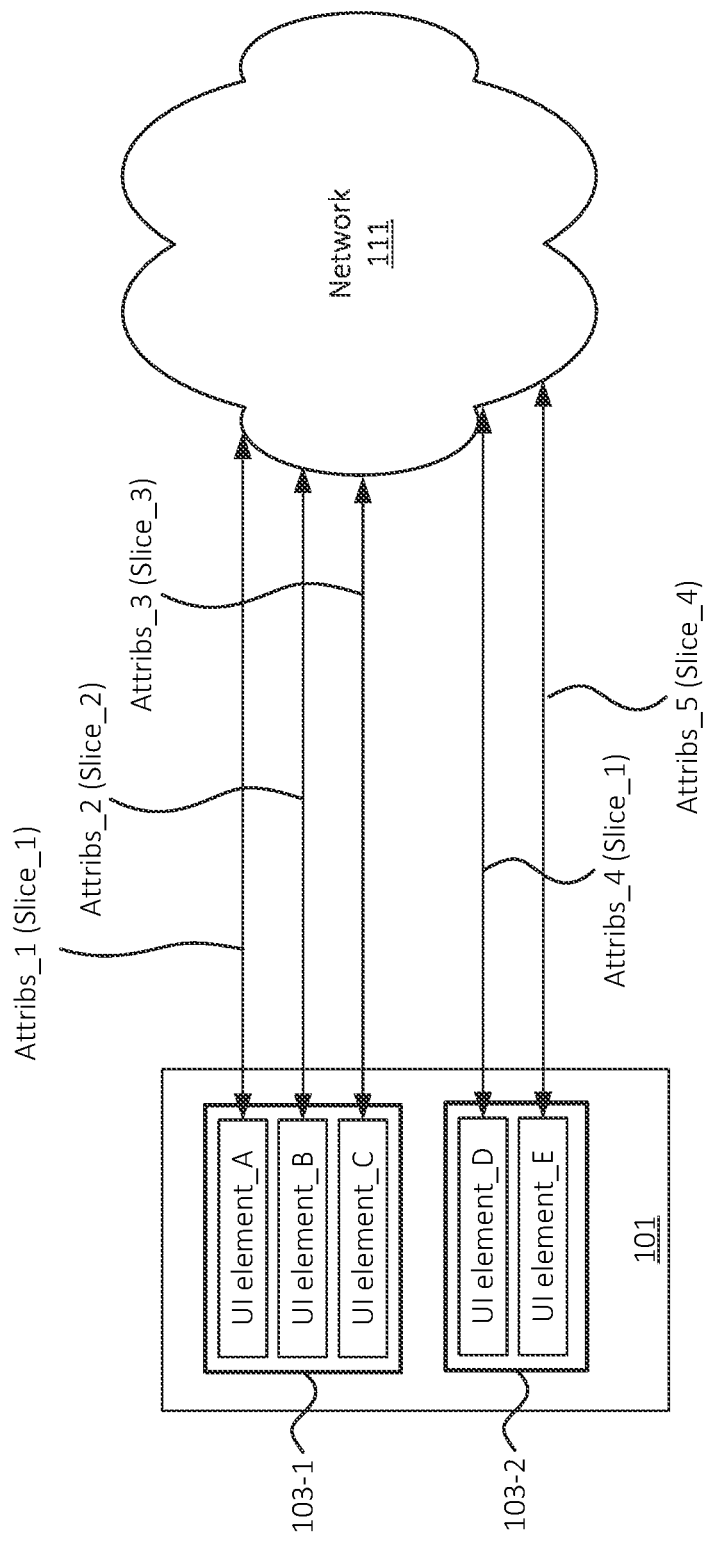

As noted above, multiple iterations of the above operations may be performed by one or multiple applications 103 executing at UE 101. For example, as shown in FIG. 2, UE 101 may execute two applications 103-1 and 103-2. In this example, traffic according to three separate sets of traffic attributes (shown as "Attribs_1," "Attribs_2," and "Attribs_3") may be sent or received by application 103-1. The different sets of traffic attributes may be associated with traffic that is sent or received by application 103-1 and that is also associated with respective UI elements of application 103-1. As discussed above, the separate UI elements may include different display areas of a UI, different tabs or windows, widgets that may be overlaid over UI elements of the same application 103-1 or other applications 103, different buttons or other selectable UI elements, etc. Similarly, traffic according to two separate sets of traffic attributes (shown as "Attribs_4" and "Attribs_5") may be sent or received by application 103-2 (e.g., where such traffic is respectively associated with different UI elements of application 103-2).

As shown, traffic according to each respective set of traffic attributes may be associated with a particular network slice. As further shown, applications 103-1 and 103-2 may both be associated with traffic that is associated with the same slice. For example, traffic associated with application 103-1 and Attribs_1, as well as traffic associated with application 103-2 and Attribs_4, may both be associated with Slice_1. In some embodiments, UE 101 (e.g., OS/network interface 107) may establish two separate communication sessions (e.g., protocol data unit ("PDU") sessions or other types of communication sessions) between UE 101 and network 111, where one of the two communication sessions is associated with the Slice_1 traffic of application 103-1 and where the other communication session is associated with the Slice_1 traffic of application 103-2. In some embodiments, UE 101 may use the same communication session between UE 101 and network 111 for Slice_1 traffic associated with applications 103-1 and 103-2, and may internally route incoming traffic received via such communication session (e.g., from network 111) to application 103-1 or application 103-2, as appropriate. In some embodiments, traffic associated with different UI elements (e.g., within the same or different applications 103) may be associated with the same network slice. In some embodiments, particular network slices and/or communication sessions may be associated with traffic associated with particular UI elements (e.g., a "private" or "secure" mode may be associated with such UI elements, such as an encryption-based or otherwise secure type of communication session for such traffic).

Figure 3:
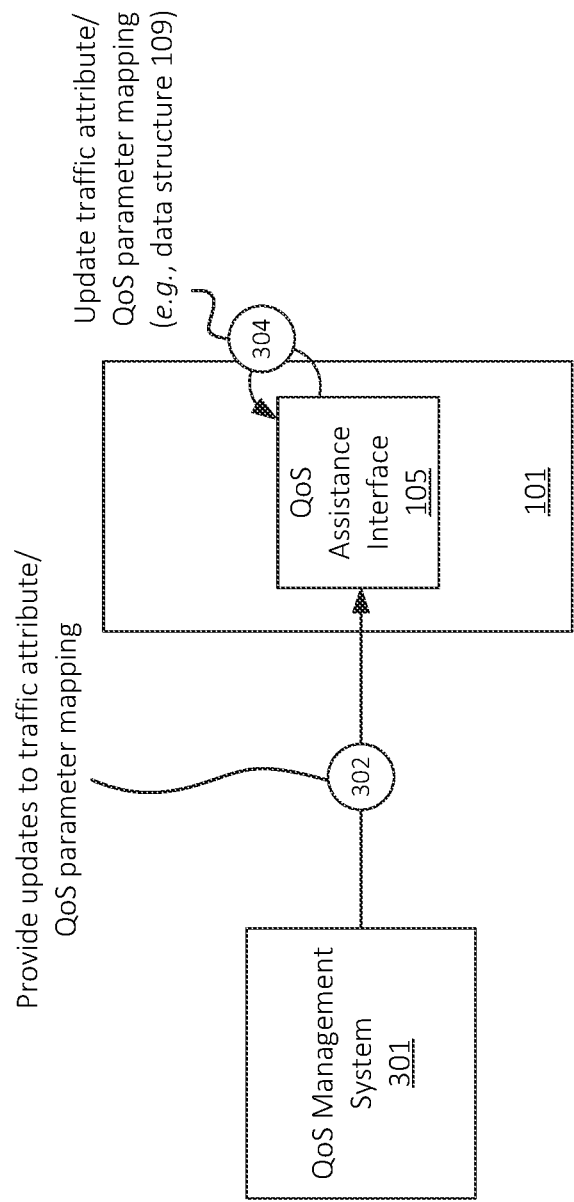
FIG. 3 illustrates an example update procedure for mapping information associating sets of traffic attributes to sets of QoS parameters, in accordance with some embodiments.

In some embodiments, QAI 105 may receive dynamically updated information that associates particular traffic attributes with particular QoS parameters. For example, as shown in FIG. 3, QAI 105 may receive (at 302) updates to information mapping particular traffic attributes to particular QoS parameters from QoS Management System ("QMS") 301. QAI 105 may receive such updates via an API, Over-the-Air ("OTA") updates, OS updates, user-initiated update procedures, etc. In some embodiments, QAI 105 may authenticate QMS 301 and/or otherwise verify validity of the provided update using one or more suitable authentication mechanisms (e.g., token exchange, key-based encryption, etc.). In some embodiments, QMS 301 may provide such updates periodically, intermittently, or on some other ongoing basis. For example, QMS 301 may utilize artificial intelligence/machine learning ("AI/ML") techniques or other suitable techniques to determine optimal, preferred, etc. sets of mappings between traffic attributes and QoS parameters. For instance, QMS 301 may identify that a previously provided set of QoS parameters associated with a given FQDN results in traffic latency that exceeds a threshold latency associated with a traffic type or service associated with traffic sent to or received by UEs 101 to and/or from an application server with which the FQDN is associated. In this example, QMS 301 may associate the same FQDN with a different set of QoS parameters (e.g., a network slice with higher priority, with an SLA associated with lower latency, etc.), and may provide (at 302) updated information to one or more UEs 101 (e.g., QAIs 105 associated with such UEs 101) indicating the newly selected QoS parameters.

As another example, as discussed below, QMS 301 may receive information associating particular UI elements of particular applications 103 that are associated with particular traffic attributes and/or QoS parameters. For example, QMS 301 may receive such information from a user of UE 101, from a network operator (e.g., an operator of network 111) via a firmware or OTA update, from a provisioning and/or management system that manages the registration UE 101 with network 111, an application developer, and/or some other suitable source.

Based on receiving (at 302) the updated mapping information, QAI 105 may update (at 304) mapping information stored by and/or otherwise associated with QAI 105. For example, QAI 105 may modify data structure 109 to reflect the updated mapping information. In some embodiments, QAI 105 and/or OS/network interface 107 may automatically associate traffic flows, associated with application 103, with different QoS parameters based on the received updates. For example, QAI 105 and/or OS/network interface 107 may identify that the updated mapping information indicates that the QoS parameters for an existing traffic flow have changed (e.g., from a first network slice to a second network slice). In this manner, QoS parameters for particular traffic attributes may be modified (e.g., by a user of UE 101, by a network operator or other entity associated with QMS 301 and/or QAI 105, and/or some other suitable entity) without requiring intervention from application 103 or "awareness" by application 103 of QAI 105. For example, such modifying may not require application 103 to output a new flow request.

As noted above, and as shown in FIG. 4, particular UI elements of a given application 103 may be specified as being associated with particular QoS parameters. For example, in accordance with embodiments described herein, traffic that is sent or received based on interactions with a particular button, tab, window, etc. of a UI of application 103 may be specified as being associated with a particular set of QoS parameters. As such, in some embodiments, QMS 301 may generate and/or refine (at 402) one or more UI element/traffic attribute models 401 (referred to herein simply as "models 401"), which associate particular UI element attributes 403 with particular traffic attributes 405.

UI element attributes 403 may refer to, for example, the visual appearance of one or more UI elements of a given application 103, identifiers or other suitable information used (e.g., by application 103) to indicate the association of particular traffic with a particular UI element (e.g., a tab identifier, a window identifier, etc.), and/or other attributes of UI elements of application 103. The visual appearance of a given UI element may include information such as height, width, color, font, text content (e.g., words or phrases), position within a UI of application 103, and/or other visually identifiable attributes. Identifiers associated with particular UI elements may include codes, metadata, etc. that follow a certain format, where such information may ultimately be included in header information in traffic sent or received via such UI elements. For example, different windows or tabs of the UI of application 103 may be associated with the format "WindowAppA_xxx," where "xxx" is a variable number that may change for different windows. For example, a first window of application 103 may be associated with the identifier "WindowAppA_123," while a second window of application 103 may be associated with the identifier "WindowAppA_456."

In order to identify particular UI element attributes 403, QMS 301 may perform image recognition techniques, packet inspection techniques, UI element inspection techniques (e.g., analyzing code, style sheets, or other information specifying respective UI elements), AI/ML techniques, or other suitable techniques with respect to a UI of application 103. For example, QMS 301 may use AI/ML techniques, image recognition techniques, or the like to visually identify UI elements such as buttons, tabs, windows, etc. in a UI of application 103. In some embodiments, the generation and/or refinement (at 402) of models 401 may be performed in an assisted manner (e.g., in which a user, administrator, etc.) provides feedback or explicit indications of particular UI elements that have particular UI element attributes 403. Additionally, or alternatively, QMS 301 may generate or refine (at 402) models 401 in a fully automated manner, in which QMS 301 identifies UI elements and their corresponding UI attributes 403 without intervention or assistance from a user.

In some embodiments, QMS 301 may dynamically and/or on an ongoing, real-time basis determine respective UI element attributes 403 or respective UI elements, such that QMS 301 is up-to-date as to the status of each UI element, and/or to maintain an overall current state of the UI as it is being presented to a user. For example, QMS 301 may detect that a display area is associated with video streaming traffic, and may dynamically determine a bitrate, codec, resolution, or other parameter (or may request such parameters from a content provider) of the video streaming based on a size of the display area in the UI. For example, the display area may be user-configurable or re-sizeable, and different bitrates or other parameters may be associated with different sizes or aspect ratios of the display area. For example, if the display area is relatively small, then the associated video streaming traffic may be associated with a relatively low bitrate, whereas if the display area is relatively large, then the associated video streaming traffic may be associated with a relatively high bitrate.

QMS 301 may also identify particular traffic attributes 405 that are associated with a given UI element (e.g., a UI element with a particular set of UI element attributes 403). For example, QMS 301 may identify that traffic associated with a particular UI element (e.g., having a particular set of UI element attributes 403) of application 103 is associated with a particular protocol, packet size, endpoint, etc. QMS 301 may, for example, use AI/ML techniques, semi-automated or assisted techniques, or other suitable techniques to identify particular traffic attributes 405 associated with a particular set of UI element attributes 403.

As one example, QMS 301 may determine that when a red button located at the bottom left corner of a UI of application 103 is selected, that application 103 sends and receives traffic to a first endpoint (e.g., a first application server). Continuing with the example, QMS 301 may also determine that when a blue button located at the top right corner of the same UI of application 103 is selected, that application 103 sends and receives traffic to a second endpoint.

In the preceding example, the color, location, and type of the first UI element (e.g., red button at the bottom left corner) may correspond to a first set of applications 103, and the traffic associated with the first application server (e.g., which may include header information specifying the first application server) may correspond to a first set of traffic attributes 405. Since QMS 301 further has determined that selection of the first UI element is associated with traffic sent and received to and from the first application server, QMS 301 may identify that the first set of applications 103 correlates to, corresponds to, is associated with, is linked to, etc. the first set of traffic attributes 405.

Similarly, the color, location, and type of the second UI element (e.g., blue button at the top right corner) may correspond to a second set of applications 103, and the traffic associated with the second application server (e.g., which may include header information specifying the second application server) may correspond to a second set of traffic attributes 405. Since QMS 301 further has determined that selection of the second UI element is associated with traffic sent and received to and from the second application server, QMS 301 may identify that the second set of applications 103 correlates to, corresponds to, is associated with, is linked to, etc. the second set of traffic attributes 405. In this sense, models 401 may include information associating the first set of UI element attributes 403 with the first set of traffic attributes 405, and the second set of UI element attributes 403 with the second set of traffic attributes 405.

Figure 4:
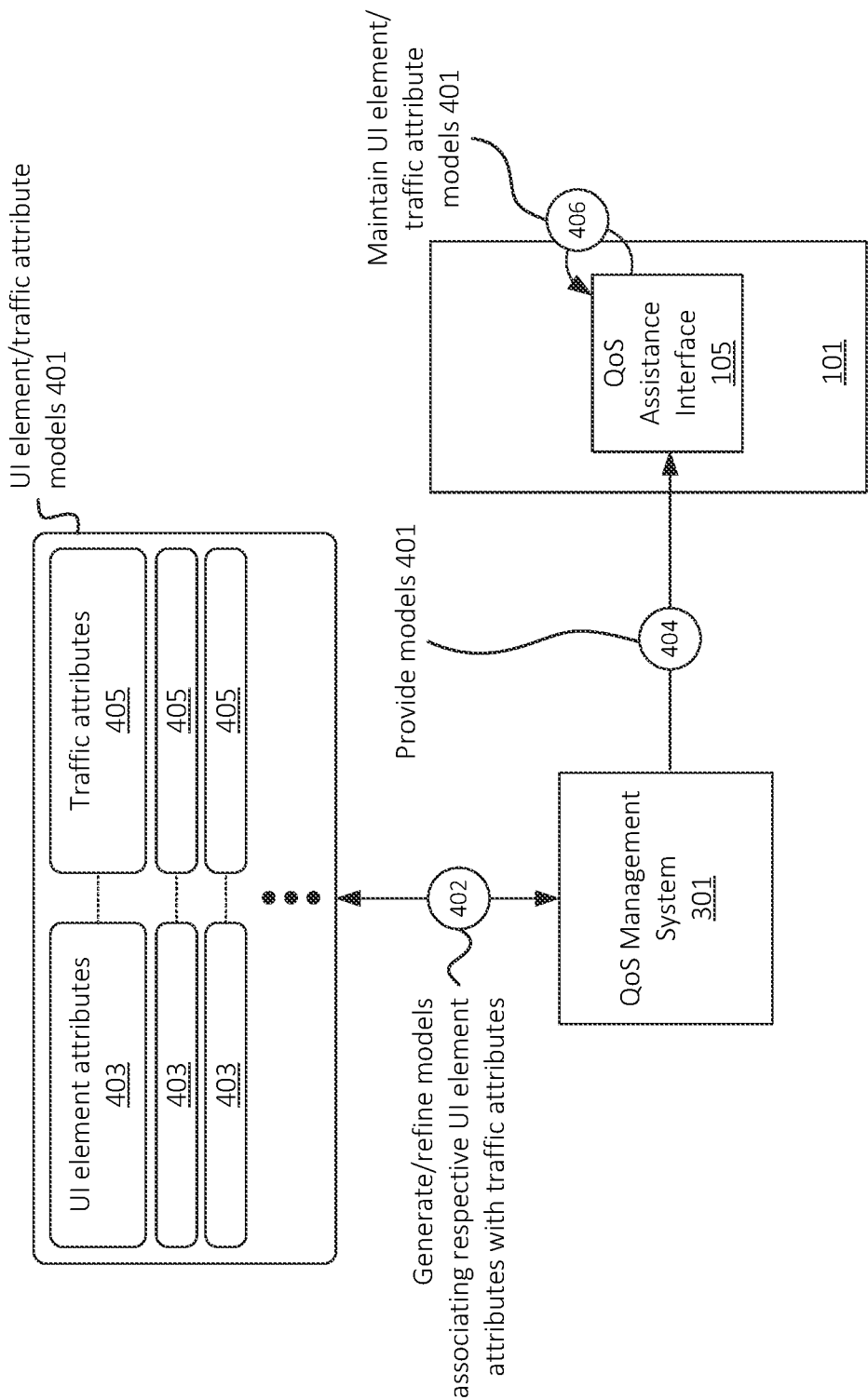
FIG. 4 illustrates an example of generating or modifying models that associate attributes of UI elements with traffic attributes, in accordance with some embodiments.

QMS 301 may provide (at 404) models 401 to QAI 105. Although FIG. 4 shows QMS 301 providing models 401 to one QAI 105 (e.g., associated with one UE 101), QMS 301 may provide some or all models 401 to multiple instances of QAI 105 (e.g., associated with multiple UEs 101). QMS 301 may, for example, communicate with QAI 105 via an API or other suitable communication pathway. QMS 301 may provide (at 404) models 401 in conjunction with, or independently from, providing (at 302) information associating particular traffic attributes 405 with QoS parameters. In this sense, embodiments may provide for granularity and flexibility to separately associate traffic attributes 405 with UI element attributes 403 and with QoS parameters. This granularity and flexibility may provide for the fine-tuning of respective associations between traffic attributes 405 and UI element attributes 403, and between traffic attributes 405 and respective QoS parameters.

QAI 105 may accordingly maintain (at 406) the provided models 401. As discussed below, QAI 105 may utilize models 401, in conjunction with traffic attribute/QoS parameter mapping information (e.g., data structure 109), to ultimately determine QoS parameters associated with particular UI elements of particular applications 103 and to process traffic according to such QoS parameters.

Figure 5:
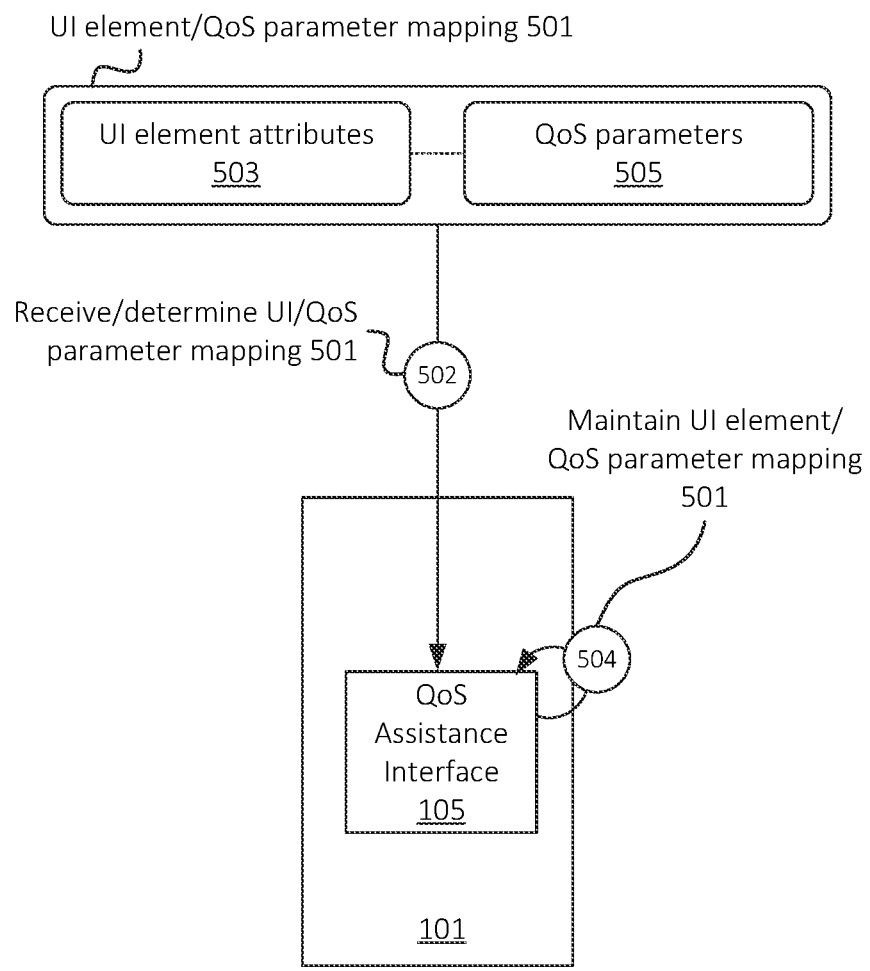
FIG. 5 illustrates an example of an association between UI elements and QoS parameters, in accordance with some embodiments.

As shown in FIG. 5, QAI 105 may further receive or otherwise determine (at 502) UI element/QoS parameter mapping information 501. For example, as discussed below, QAI 105 may receive a selection or other indication, from a user of UE 101, specifying one or more particular UI elements to associate with particular QoS parameters (e.g., a particular network slice, a particular URSP rule, etc.). Additionally, or alternatively, QAI 105 may receive UI element/QoS parameter mapping information 501 from QMS 301 (e.g., via an OTA update procedure) or some other suitable source.

UI element/QoS parameter mapping information 501 may specify attributes 503 of one or more UI elements for which specific QoS parameters 505 are to be applied. For example, as discussed below, a user may use a graphical tool or other suitable mechanism to indicate particular UI elements, such as buttons, tabs, display areas, etc. for which specific QoS parameters 505 (e.g., a particular network slice, a maximum latency, a minimum throughput, etc.) are desired. QAI 105 may, pursuant to the selection by the user, identify one or more attributes 503 of the indicated UI element(s), such as a color, shape, dimension, position within a display area, text content, etc. of the UI element(s). For example, QAI 105 may use AI/ML techniques, image recognition techniques, or other suitable techniques to identify attributes 503 of the indicated UI elements.

As another example, as also discussed below, QAI 105 may automatically identify UI elements of one or more applications 103 executing at UE 101, and may present options for a user of UE 101 to specify particular QoS parameters 505 for such UI elements. For example, QAI 105 may communicate with an OS of UE 101 (e.g., via an API or other suitable communication pathway) to identify active processes, applications, windows, tasks, tabs, etc., and may identify attributes (e.g., process identifiers, window identifiers, application names, etc.) of such processes, applications, etc. that are executing at UE 101. QAI 105 may maintain (at 504) UI element/QoS parameter mapping information 501, such that traffic associated with the indicated UI elements is ultimately able to be treated in accordance with the respective QoS parameters 505.

Figure 6:
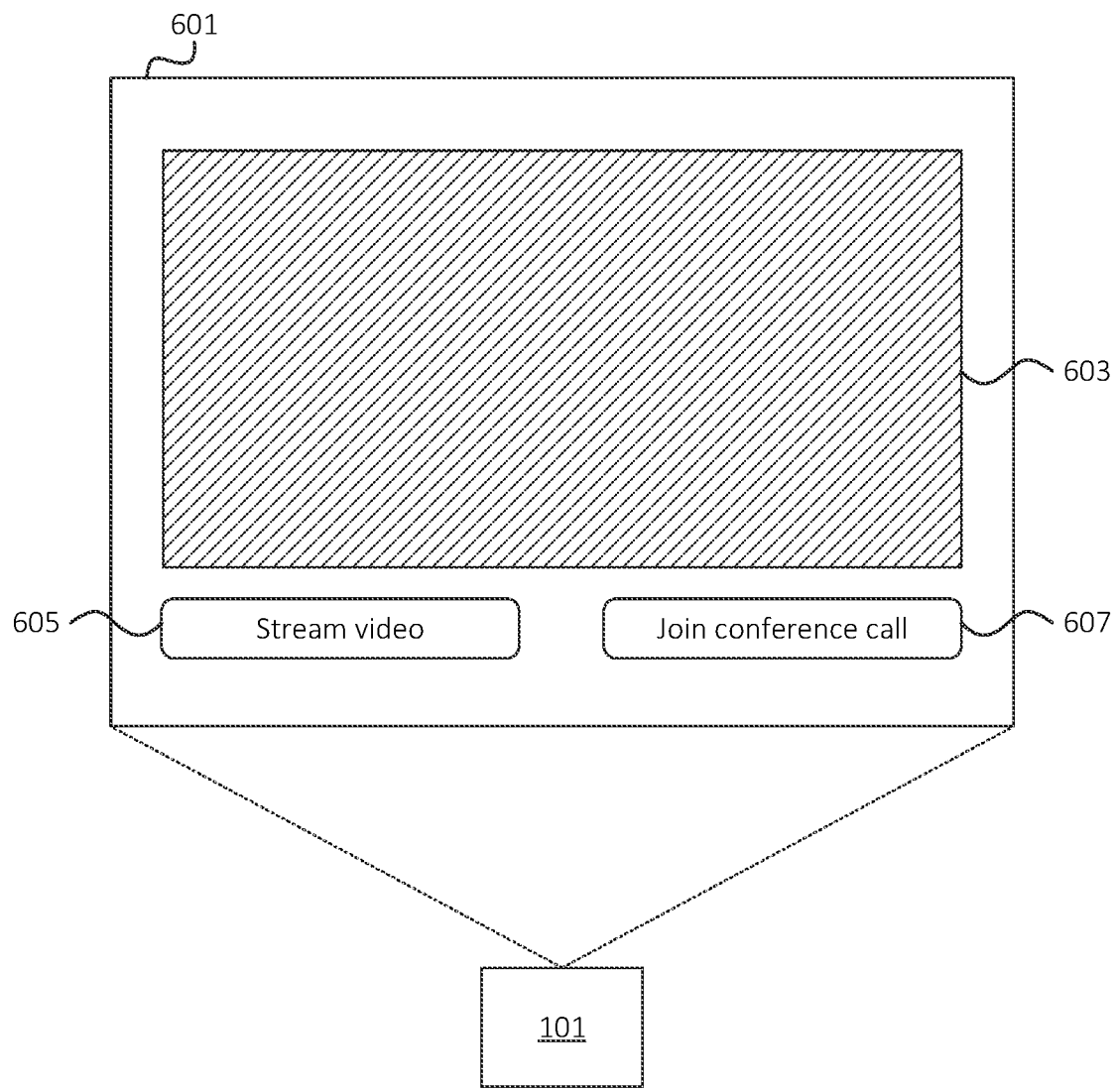
FIGS. 6-9 illustrate examples of receiving a user selection of particular UI elements of a particular application to associate with particular QoS parameters, in accordance with some embodiments.

FIG. 6 illustrates an example UI 601, which includes UI elements such as display area 603 and buttons 605 and 607. UI 601 may be associated with (e.g., presented by, initiated by, and/or otherwise associated with) a particular application 103 executing at UE 101. In this example, button 605 may be associated with a video streaming service (e.g., which may initiate the streaming of video content, such as movies, via display area 603), and button 607 may be associated with a video conferencing service (e.g., where participants in a videoconference may be shown via display area 603).

Figure 7:
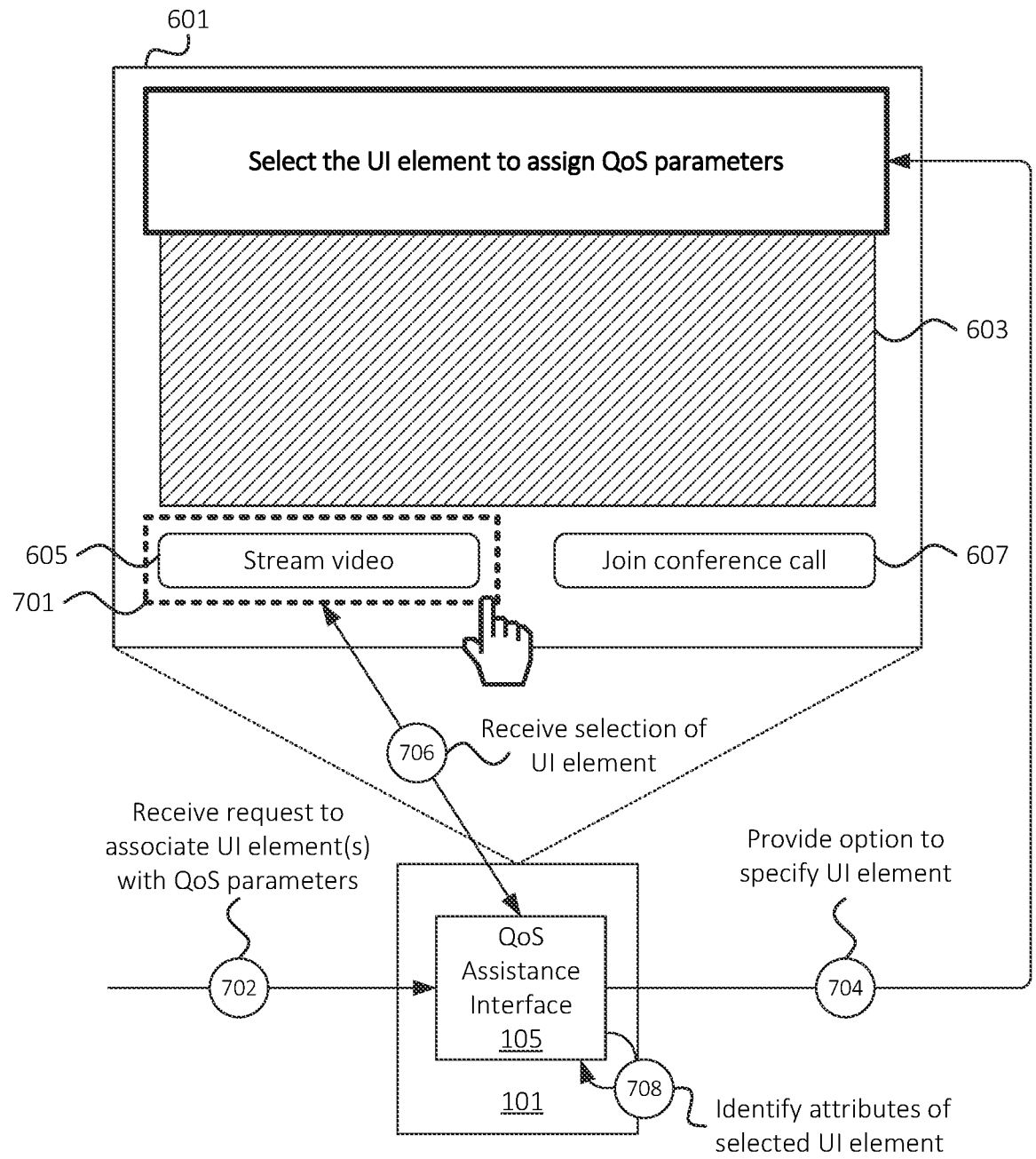

As shown in FIGS. 7, QAI 105 may receive (at 702) a request to initiate the association of one or more UI elements, of UI 601, with a particular set of QoS parameters. For example, QAI 105 may provide an overlay, an application, or some other type of mechanism by which a user of UE 101 may indicate that the user wishes to specify a UI element to associate with a particular set of QoS parameters. Based on receiving (at 702) the request to initiate the associating of a UI element of UI 601 with a set of QoS parameters, QAI 105 may provide (at 704) an option to specify a particular UI element of UI 601. QAI 105 may, for example, present a visual pop-up, overlay, etc. that indicates that a tool or mechanism for the user selection of a UI element of UI 601 is available. In some embodiments, the pop-up, overlay, etc. may include multiple types of tools or mechanisms by which the user may indicate a particular UI element of UI 601. In these examples the tool or mechanism may include a cropping-type tool, in which the user is able to drag and drop the corners of a box (e.g., box 701 with dashed lines) to visually indicate the selection of button 605. In this sense, QAI 105 may receive (at 706) the user selection of button 605, such as by performing image recognition techniques to identify that button 605 was selected.

Figure 8:
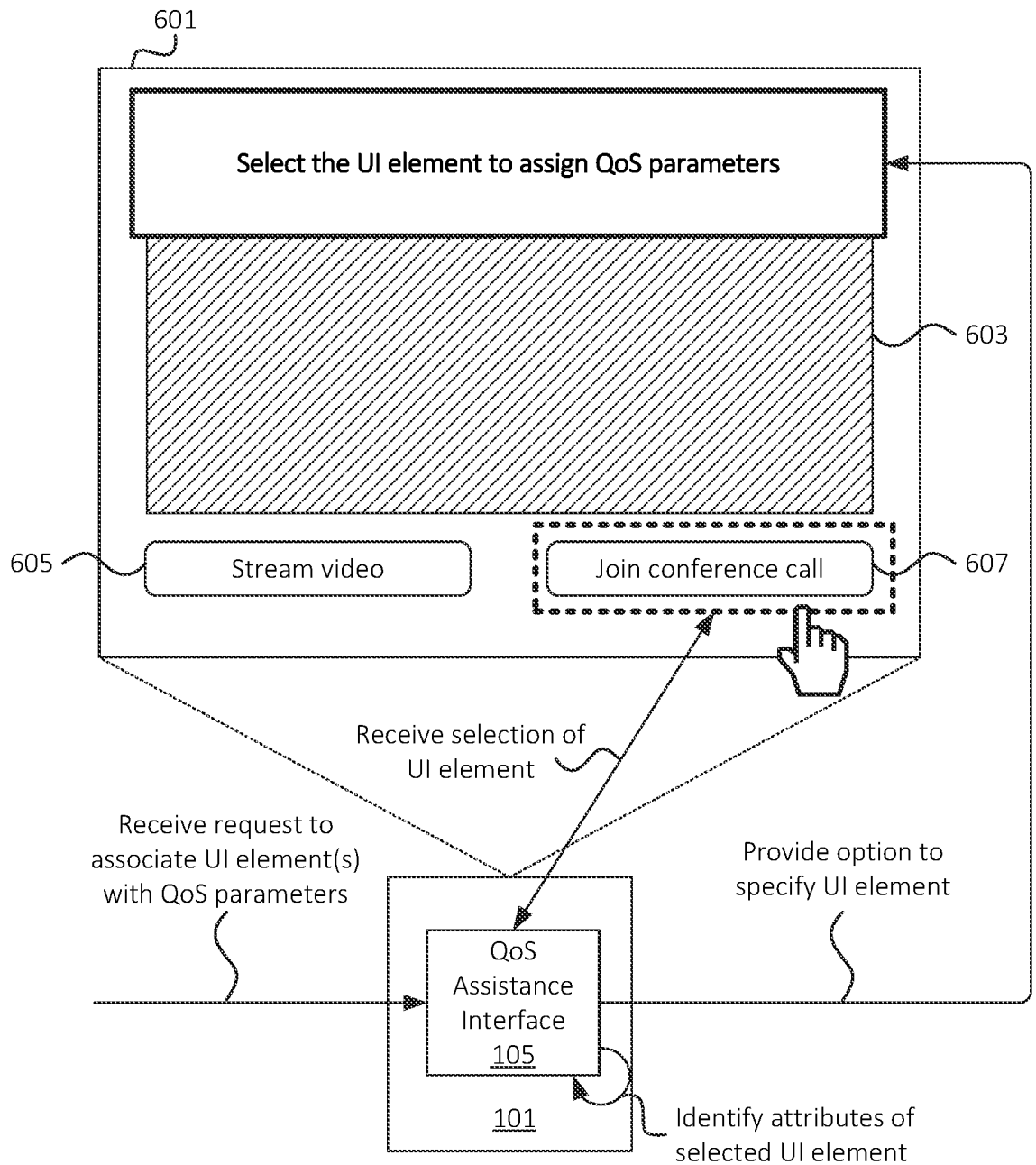

QAI 105 may further identify (at 708) the attributes of the selected UI element. For example, QAI 105 may identify a shape, color, location within UI 601, text content (e.g., "Stream video"), UI element type (e.g., button), and/or other attributes. For example, QAI 105 may utilize AI/ML techniques, image recognition techniques, and/or other suitable techniques to identify the attributes of the selected button 605. In some embodiments, QAI 105 may analyze code, metadata, etc. associated with UI 601 (e.g., Hypertext Markup Language ("HTML") code or other accessible information) to identify the attributes of the selected button 605. As shown in FIG. 8, similar operations may be performed to identify attributes of a different UI element selected by a user of UE 101 (e.g., button 607).

Figure 9:
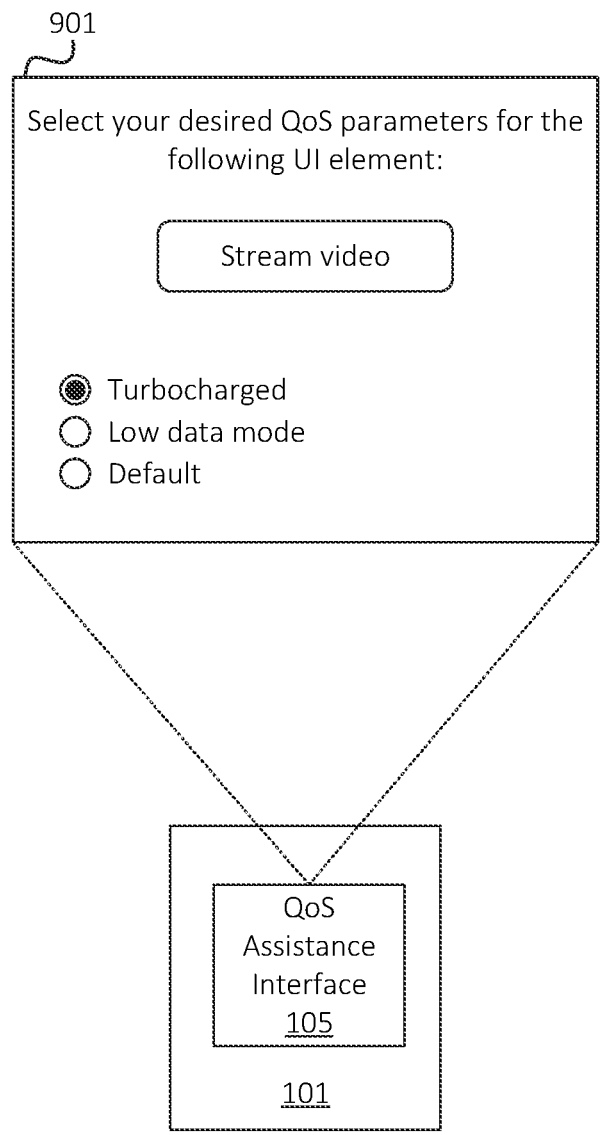

Once a particular UI element has been selected and QAI 105 has determined (e.g., at 708) attributes of the selected UI element, QAI 105 may provide an option for the user to specify one or more QoS parameters. For example, as shown in FIG. 9, QAI 105 may present UI 901, which shows the specified UI element (e.g., button 605, as selected in the example of FIG. 7), along with one or more options for different QoS parameters that may be applied to traffic associated with the UI element. In some embodiments, the options for the QoS parameters may be presented with "friendly" names that do not necessarily indicate the actual QoS parameters that would be applied. For example, the example "turbocharged" setting may be associated with a first network slice or other set of QoS parameters, the example "low data mode" setting may be associated with a second network slice or other set of QoS parameters, a "secure" setting may be associated with a third network slice or other set of QoS or security parameters, etc. In some embodiments, the "default" setting may be used to indicate that QAI 105 does not apply or request different QoS parameters than would otherwise be used for traffic associated with the UI element. In some embodiments, QAI 105 may maintain a mapping between different "friendly" names and associated QoS parameters, may receive (e.g., from QMS 301 or some other source) a list or other indication of particular QoS parameters that are available for UE 101, may receive a list or other indication of particular QoS parameters that are available for application 103 with which the selected UI element is associated, or may otherwise determine or identify the potential QoS parameters that are selectable and which may be applied to traffic associated with the selected UI element. In this example, the user may have selected the "turbocharged" option for traffic associated with button 605. For example, the user may desire that video streamed via UI 601 (e.g., as displayed in display area 603) is sent to UE 101 according to a "turbocharged" set of QoS parameters (e.g., where such QoS parameters may include a particular network slice, a particular minimum throughput, a particular maximum latency, etc.).

Figure 10:
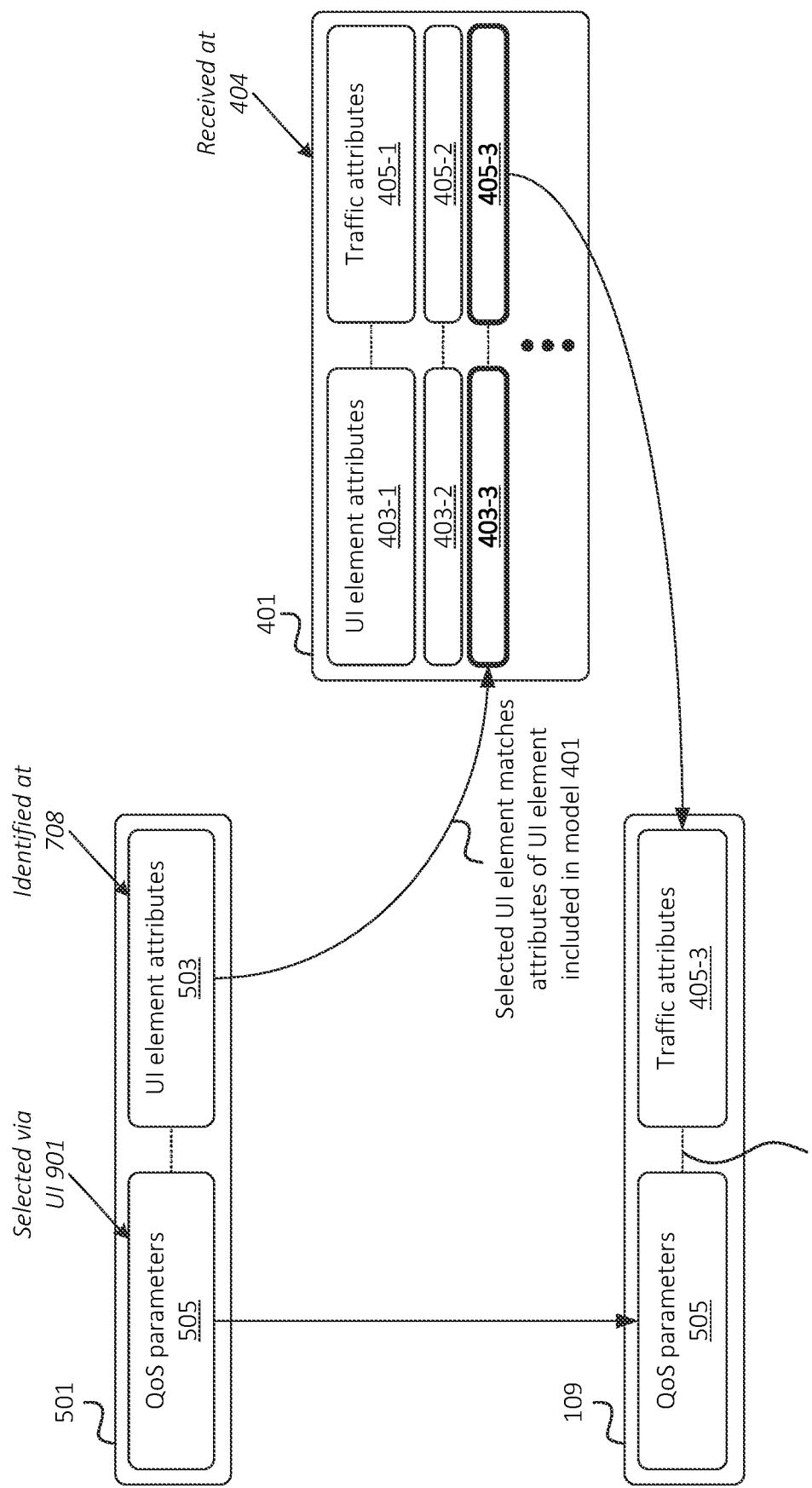
FIG. 10 illustrates an example of updating or modifying a data structure to reflect a particular set of QoS parameters to be applied to traffic associated with a given UI element, in accordance with some embodiments.

FIG. 10 illustrates an example of updating or modifying data structure 109 to reflect that particular sets of QoS parameters should be applied to traffic associated with a given UI element. As shown, UI element/QoS parameter mapping information 501 may reflect the selection (e.g., (at 706) of the particular UI element and the selection (e.g., via UI 901) of a particular set of QoS parameters 505. As discussed above, UI element/QoS parameter mapping information 501 may include a particular set of UI element attributes 503 identified (e.g., at 708) by QAI 105 based on the user selection.

QAI 105 may further identify that particular attributes 503 of the identified UI element match a particular set of UI element attributes 403-3 as included in model 401. For example, QAI 105 may perform any suitable comparison or similarity detection technique to identify that a measure of similarity or correlation between attributes 503 and attributes 403-3 exceeds a threshold measure of similarity or correlation. Additionally, or alternatively, QAI 105 may identify that attributes 403-3 match attributes 503 with the highest measure of similarity or correlation, out of all of the sets of attributes 403 of model 401 (e.g., attributes 403-3 may be more similar to attributes 503, and attributes 403-1 and 403-2 may be less similar to attributes 503).

QAI 105 may accordingly identify that particular traffic attributes 405-3 are indicated by model 401 as being associated with the identified attributes 403-3. For example, QAI 105 may identify that UI element attributes 403-3 are more likely to be associated with traffic attributes 405-3 than with traffic attributes 405-1 or 405-2. As such, QAI 105 may modify data structure 109 to reflect that traffic meeting attributes 405-3 should be processed according to the particular set of QoS parameters 505. In this manner, the particular set of QoS parameters 505, specified as being associated with the particular UI element, may be applied to traffic that has attributes 405-3 (e.g., where model 401 indicates that traffic having attributes 405-3 is associated with, or is likely to be associated with, the selected UI element).

As discussed above, UE 101 may proceed to process such traffic (e.g., traffic associated with the selected UI element) in accordance with the selected QoS parameters. For example, application 103 (with which the UI element is associated) may output (at 102) traffic having different sets of attributes. Some of the traffic may have attributes which meet attributes 405-3. QAI 105 may identify such traffic, and may identify (at 104) the particular QoS parameters 505 are associated with the identified traffic (e.g., based on data structure 109). QAI 105 may proceed to forward (at 106) the identified traffic (e.g., traffic associated with the particular UI element) to OS/network interface 107 with an indication of the particular QoS parameters 505 associated with the traffic, and OS/network interface 107 may process and/or output (at 108) the traffic to network 111 accordingly.

Figure 11:
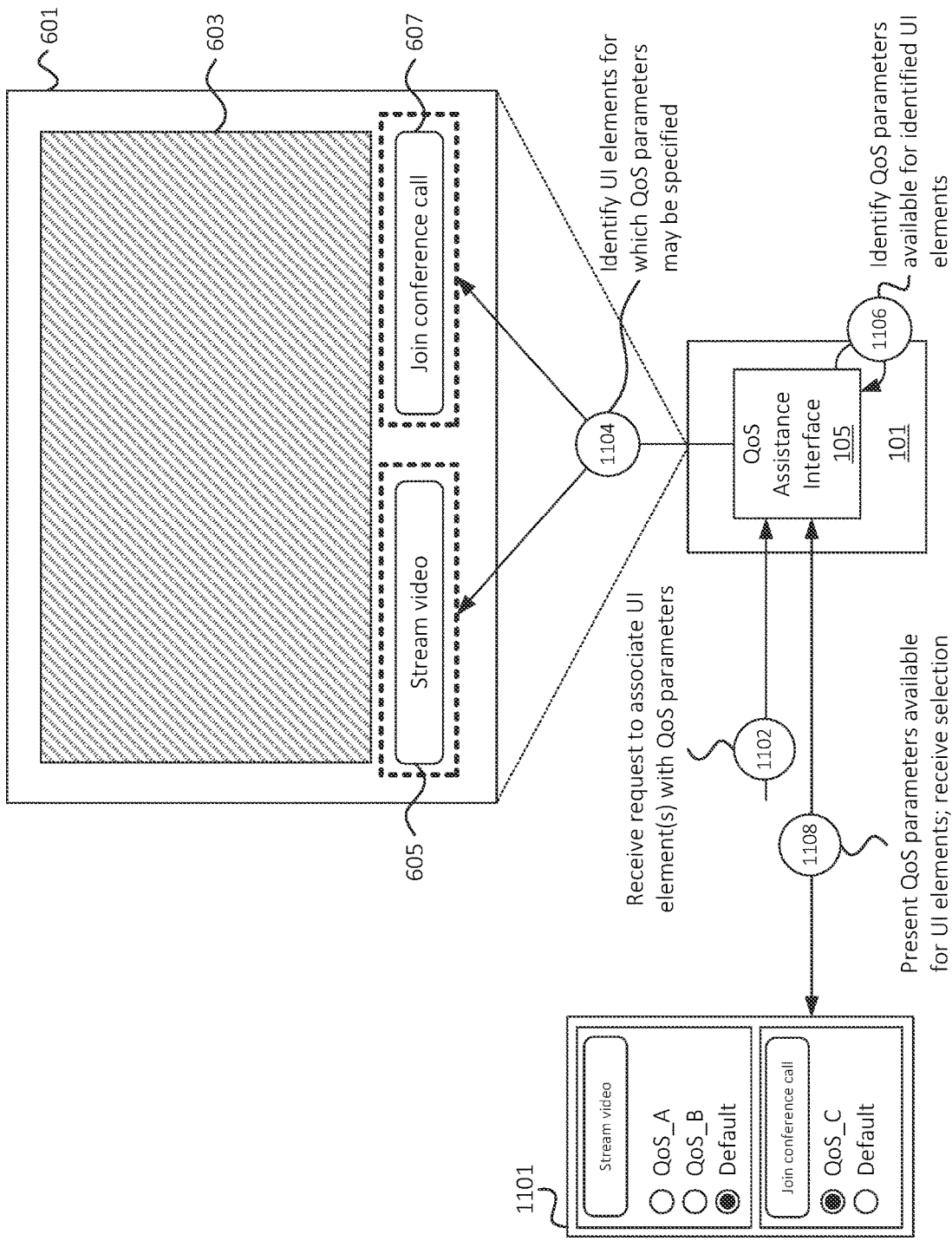
FIG. 11 illustrates an example of updating information to reflect that particular sets of QoS parameters should be applied to traffic associated with a given UI element, in accordance with some embodiments.

In some embodiments, QAI 105 may utilize different techniques to receive a selection of one or more UI elements to associate with particular QoS parameters. For example, as shown in FIG. 11, QAI 105 may receive (at 1102) a request to associate one or more UI elements (e.g., of UI 601) with respective QoS parameters. For example, a user of UE 101 may specify (at 1102) UI 601 without yet specifying UI elements within UI 601. QAI 105 may automatically identify (at 1104) UI elements for which QoS parameters may be specified. For example, QAI 105 may utilize image recognition techniques, may analyze code or metadata associated with UI 601, etc. In this example, QAI 105 may identify (at 1104) buttons 605 and 607. For example, QAI 105 may identify that attributes of buttons 605 and 607 match attributes included in model 401. On the other hand, in this example, QAI 105 may not identify display area 603, in scenarios where attributes of display area 603 are not included in model 401. In this manner, QAI 105 may avoid identifying extraneous UI elements for which QoS parameters are not available.

QAI 105 may further identify (at 1106) available QoS parameters for the identified UI elements. For example, as discussed above, QAI 105 may maintain a list of available QoS parameters that may be applied to UI elements meeting certain attributes, may maintain a list of available QoS parameters for UE 101, may maintain a list of available QoS parameters for UI 601, or the like. QAI 105 may present (at 1108) UI 1101, which includes selectable options for QoS parameters to apply to any or all of the identified (at 1104) UI elements of UI 601. In this manner, a user may be able to quickly identify all available options for all UI elements within one or more UIs, and quickly assign QoS parameters for each individual UI element.

Figure 12:
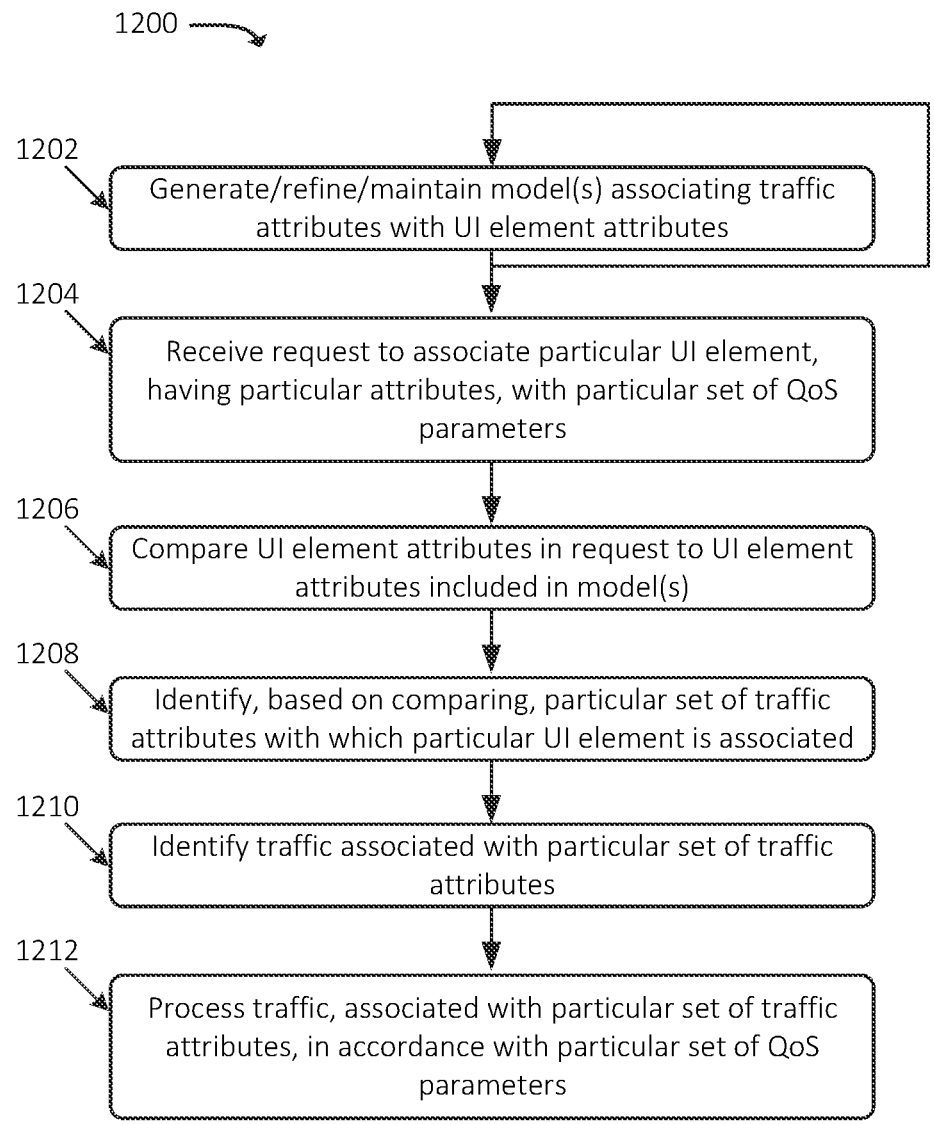
FIG. 12 illustrates an example process for processing traffic, associated with a particular UI element, in accordance with a particular set of QOS parameters, in accordance with some embodiments.

FIG. 12 illustrates an example process 1200 for processing traffic, associated with a particular UI element, in accordance with a particular set of QoS parameters, in accordance with some embodiments. In some embodiments, some or all of process 1200 may be performed by UE 101 (e.g., by QAI 105 and/or OS/network interface 107 of one or more UEs 101). In some embodiments, one or more other devices may perform some or all of process 1200 in concert with, and/or in lieu of, UE 101. For example, in some embodiments, some or all of the functionality described with respect to QAI 105 may be performed by a device or system external to UE 101, such as a Multi-Access/Mobile Edge Computing ("MEC") device, referred to sometimes herein simply as a "MEC," that is communicatively coupled to, or is integrated in, a RAN with which UE 101 wirelessly communicates. In such embodiments, by virtue of the MEC devices relatively powerful processing capabilities as well as low latency wireless communications between UE 101 and the MEC device, QAI 105 (when implemented at the MEC device) may be able to perform some or all of the operations described below with minimal to no disruption to the user experience of a user of UE 101.

As shown, process 1200 may include generating, refining, and/or maintaining (at 1202) information associating sets of traffic attributes with sets of UI element attributes. For example, as discussed above, QAI 105 (which may be installed, implemented, executing, etc. at UE 101 and/or at an external device such as a MEC device) may receive (e.g., from QMS 301 and/or some other source) one or more models, mapping information, etc. associating particular sets of attributes of traffic (e.g., header information, endpoint information, protocol information, etc.) with particular UI elements of one or more UIs associated with one or more applications that are executable at UE 101. In some embodiments, QAI 105 may employ AI/ML techniques, training techniques, or other suitable techniques to generate or refine such models. Generally, the association between traffic attributes and UI element attributes may indicate that traffic having a certain "signature" or other identifiable attributes is traffic that is associated, in some significant manner, with UI elements having some particular set of attributes. As discussed above, as one example, traffic that is sent or received by UE 101 based on a user selection of a first UI element may be associated with a first set of traffic attributes, while traffic that is sent or received by UE 101 based on a user selection of a second UI element (which may be a UI element of the same application that includes the first UI element) may be associated with a second set of traffic attributes.

Process 1200 may further include receiving (at 1204) a request to associate a particular UI element, having a particular set of attributes, with a particular set of QoS parameters. For example, as discussed above, QAI 105 may receive a request from a user of UE 101 to associate a particular UI element with a particular set of QoS parameters. The request may include, for example, an image depicting the UI element (e.g., a screenshot, a screengrab, or some other image generated or captured using a suitable image capture mechanism). Additionally, or alternatively, the request may include a name or identifier of the UI element, such as a title or other identifier of a tab, a window, etc. In some embodiments, the request may be received via a selection from a menu, list, etc. of UI elements in one or more UIs of UE 101. In some embodiments, the request may be received from an application server, a service provider, or other suitable authorized entity that is external to UE 101 and which may be different from a user of UE 101. As discussed above, the QoS parameters may include an indicator of a particular network slice, a set of URSP rules, or some other descriptor (e.g., which may be mapped to network slices, URSP rules, or other suitable QoS parameters), or the like. As discussed above, QAI 105 may identify attributes of the indicated UI element by performing image recognition techniques or other suitable techniques.

Process 1200 may additionally include comparing (at 1206) the attributes of the selected UI element to UI element attributes included in the one or more models. For example, QAI 105 may perform a suitable similarity analysis to identify a particular set of UI element attributes, in the one or more models, that most closely match the attributes of the UI element indicated in the request. Additionally, or alternatively, QAI 105 may identify that a measure of similarity, between the attributes of the selected UI element and a particular UI element included in the models, exceeds a threshold measure of similarity.

Process 1200 may further include identifying (at 1208) a particular set of traffic attributes with which the particular UI element is associated. For example, QAI 105 may identify a particular set of traffic attributes, included in the model, with which the UI element attributes (e.g., the attributes of the selected UI element) are associated. That is, as discussed above, the one or more models may link or associate particular sets of traffic attributes with respective UI element attributes, and QAI 105 may identify which particular set of traffic attributes are associated with the attributes of the selected UI element.

Process 1200 may also include identifying (at 1210) traffic associated with the particular set of traffic attributes. For example, QAI 105 may receive traffic from one or more applications of UE 101, and/or may receive information derived or extracted from such traffic (e.g., header information, metadata, summary or digested information, etc.). For example, QAI 105 may directly receive traffic from one or more applications of UE 101, and/or may receive traffic or other suitable information (e.g., header information, metadata, etc.) from an OS of UE 101. QAI 105 may identify certain portions of the traffic that match the identified traffic attributes discussed above (e.g., where some traffic may have attributes that match the identified traffic attributes, while other traffic may not have attributes that match such identified traffic attributes). As discussed above, the same application may send or receive traffic with different attributes, which may be differentially processed (e.g., in accordance with different QoS parameters, as discussed herein).

In some embodiments, instead of QAI 105 identifying traffic associated with the particular set of traffic attributes, an OS of UE 101 and/or other suitable element of UE 101 may identify such traffic. For example, QAI 105 may provide information to the OS of UE 101, indicating particular QOS parameters to apply to traffic meeting the particular set of traffic attributes, based on which the OS of UE 101 may identify such traffic.

Process 1200 may additionally include processing (at 1212) traffic, associated with the particular set of traffic attributes, in accordance with the particular set of QoS parameters. For example, QAI 105 may mark, classify, categorize, tag, etc. such traffic with one or more indicators, identifiers, etc. that signify the particular set of QoS parameters. As such, the OS of UE 101 and/or network elements external to UE 101 may prioritize, route, forward, etc. such traffic in accordance with the QoS parameters.

Figure 13:
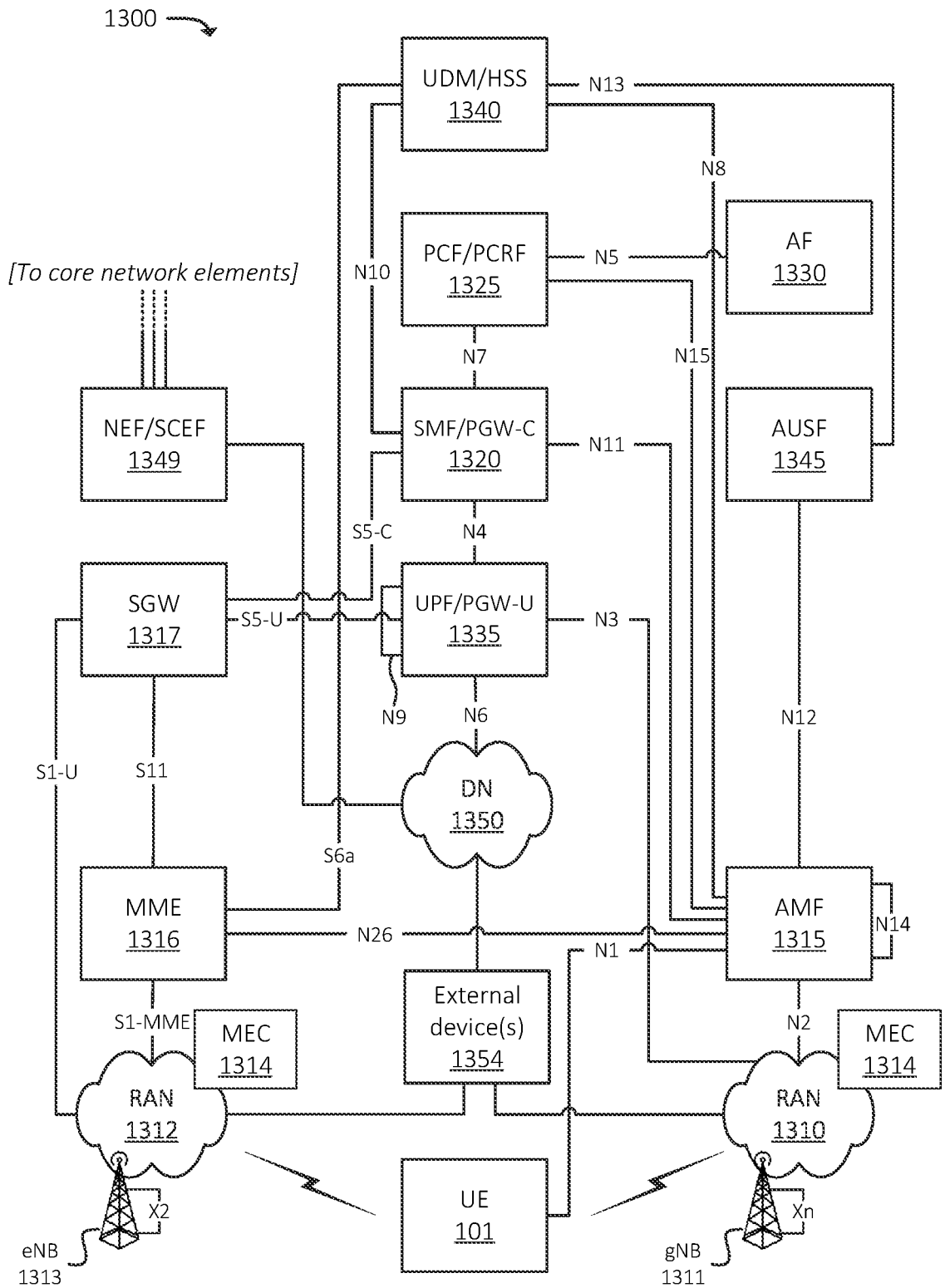
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a Fifth Generation ("5G") network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1300 may represent or may include a 5G core ("5GC"). As shown, environment 1300 may include UE 101, RAN 1310 (which may include one or more Next Generation Node Bs ("gNBs") 1311), RAN 1312 (which may include one or more evolved Node Bs ("eNBs") 1313), and various network functions such as Access and Mobility Management Function ("AMF") 1315, Mobility Management Entity ("MME") 1316, Serving Gateway ("SGW") 1317, Session Management Function ("SMF")/Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Unified Data Management ("UDM")/Home Subscriber Server ("HSS") 1340, Authentication Server Function ("AUSF") 1345, and Network Exposure Function ("NEF")/Service Capability Exposure Function ("SCEF") 1349. Environment 1300 may also include one or more networks, such as Data Network ("DN") 1350. Environment 1300 may include one or more additional devices or systems communicatively coupled to one or more networks (e.g., DN 1350), such as one or more external devices 1354.

The example shown in FIG. 13 illustrates one instance of each network component or function (e.g., one instance of SMF/PGW-C 1320, PCF/PCRF 1325, UPF/PGW-U 1335, UDM/HSS 1340, and/or AUSF 1345). In practice, environment 1300 may include multiple instances of such components or functions. For example, in some embodiments, environment 1300 may include multiple "slices" of a core network, where each slice includes a discrete and/or logical set of network functions (e.g., one slice may include a first instance of AMF 1315, SMF/PGW-C 1320, PCF/PCRF 1325, and/or UPF/PGW-U 1335, while another slice may include a second instance of AMF 1315, SMF/PGW-C 1320, PCF/PCRF 1325, and/or UPF/PGW-U 1335). The different slices may provide differentiated levels of service, such as service in accordance with different Quality of Service ("QoS") parameters.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. In some implementations, one or more devices of environment 1300 may be physically integrated in, and/or may be physically attached to, one or more other devices of environment 1300. Alternatively, or additionally, one or more of the devices of environment 1300 may perform one or more network functions described as being performed by another one or more of the devices of environment 1300.

Additionally, one or more elements of environment 1300 may be implemented in a virtualized and/or containerized manner. For example, one or more of the elements of environment 1300 may be implemented by one or more Virtualized Network Functions ("VNFs"), Cloud-Native Network Functions ("CNFs"), etc. In such embodiments, environment 1300 may include, may implement, and/or may be communicatively coupled to an orchestration platform that provisions hardware resources, installs containers or applications, performs load balancing, and/or otherwise manages the deployment of such elements of environment 1300. In some embodiments, such orchestration and/or management of such elements of environment 1300 may be performed by, or in conjunction with, the open-source Kubernetes® application programming interface ("API") or some other suitable virtualization, containerization, and/or orchestration system.

Elements of environment 1300 may interconnect with each other and/or other devices via wired connections, wireless connections, or a combination of wired and wireless connections. Examples of interfaces or communication pathways between the elements of environment 1300, as shown in FIG. 13, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 13, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 1300 may be, may include, may be implemented by, and/or may be communicatively coupled to network 111.

UE 101 may include a computation and communication device, such as a wireless mobile communication device that is capable of communicating with RAN 1310, RAN 1312, and/or DN 1350. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 1350 via RAN 1310, RAN 1312, and/or UPF/PGW-U 1335.

RAN 1310 may be, or may include, a 5G RAN that includes one or more base stations (e.g., one or more gNBs 1311), via which UE 101 may communicate with one or more other elements of environment 1300. UE 101 may communicate with RAN 1310 via an air interface (e.g., as provided by gNB 1311). For instance, RAN 1310 may receive traffic (e.g., user plane traffic such as voice call traffic, data traffic, messaging traffic, etc.) from UE 101 via the air interface, and may communicate the traffic to UPF/PGW-U 1335 and/or one or more other devices or networks. Further, RAN 1310 may receive signaling traffic, control plane traffic, etc. from UE 101 via the air interface, and may communicate such signaling traffic, control plane traffic, etc. to AMF 1315 and/or one or more other devices or networks. Additionally, RAN 1310 may receive traffic intended for UE 101 (e.g., from UPF/PGW-U 1335, AMF 1315, and/or one or more other devices or networks) and may communicate the traffic to UE 101 via the air interface.

RAN 1312 may be, or may include, a LTE RAN that includes one or more base stations (e.g., one or more eNBs 1313), via which UE 101 may communicate with one or more other elements of environment 1300. UE 101 may communicate with RAN 1312 via an air interface (e.g., as provided by eNB 1313). For instance, RAN 1312 may receive traffic (e.g., user plane traffic such as voice call traffic, data traffic, messaging traffic, signaling traffic, etc.) from UE 101 via the air interface, and may communicate the traffic to UPF/PGW-U 1335 (e.g., via SGW 1317) and/or one or more other devices or networks. Further, RAN 1312 may receive signaling traffic, control plane traffic, etc. from UE 101 via the air interface, and may communicate such signaling traffic, control plane traffic, etc. to MME 1316 and/or one or more other devices or networks. Additionally, RAN 1312 may receive traffic intended for UE 101 (e.g., from UPF/PGW-U 1335, MME 1316, SGW 1317, and/or one or more other devices or networks) and may communicate the traffic to UE 101 via the air interface.

One or more RANs of environment 1300 (e.g., RAN 1310 and/or RAN 1312) may include, may implement, and/or may otherwise be communicatively coupled to one or more edge computing devices, such as one or more MECs 1314. MECs 1314 may be co-located with wireless network infrastructure equipment of RANs 1310 and/or 1312 (e.g., one or more gNBs 1311 and/or one or more eNBs 1313, respectively). Additionally, or alternatively, MECs 1314 may otherwise be associated with geographical regions (e.g., coverage areas) of wireless network infrastructure equipment of RANs 1310 and/or 1312. In some embodiments, one or more MECs 1314 may be implemented by the same set of hardware resources, the same set of devices, etc. that implement wireless network infrastructure equipment of RANs 1310 and/or 1312. In some embodiments, one or more MECs 1314 may be implemented by different hardware resources, a different set of devices, etc. from hardware resources or devices that implement wireless network infrastructure equipment of RANs 1310 and/or 1312. In some embodiments, MECs 1314 may be communicatively coupled to wireless network infrastructure equipment of RANs 1310 and/or 1312 (e.g., via a high-speed and/or low-latency link such as a physical wired interface, a high-speed and/or low-latency wireless interface, or some other suitable communication pathway).

MECs 1314 may include hardware resources (e.g., configurable or provisionable hardware resources) that may be configured to provide services and/or otherwise process traffic to and/or from UE 101, via RAN 1310 and/or 1312. For example, RAN 1310 and/or 1312 may route some traffic from UE 101 (e.g., traffic associated with one or more particular services, applications, application types, etc.) to a respective MEC 1314 instead of to core network elements of 1300 (e.g., UPF/PGW-U 1335). MEC 1314 may accordingly provide services to UE 101 by processing such traffic, performing one or more computations based on the received traffic, and providing traffic to UE 101 via RAN 1310 and/or 1312. MEC 1314 may include, and/or may implement, some or all of the functionality described above with respect to UPF/PGW-U 1335, AF 1330, one or more application servers, and/or one or more other devices, systems, VNFs, CNFs, etc. In this manner, ultra-low latency services may be provided to UE 101, as traffic does not need to traverse links (e.g., backhaul links) between RAN 1310 and/or 1312 and the core network.

AMF 1315 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1310 and/or gNBs 1311, and/or to perform other operations. In some embodiments, the 5G network may include multiple AMFs 1315, which communicate with each other via the N14 interface (denoted in FIG. 13 by the line marked "N14" originating and terminating at AMF 1315).

MME 1316 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1312 and/or eNBs 1313, and/or to perform other operations.

SGW 1317 may include one or more devices, systems, VNFs, CNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, CNFs, etc., that gather, process, store, and/or provide information in a manner described herein. SMF/PGW-C 1320 may, for example, facilitate the establishment of communication sessions on behalf of UE 101. In some embodiments, the establishment of communications sessions may be performed in accordance with one or more policies provided by PCF/PCRF 1325.

PCF/PCRF 1325 may include one or more devices, systems, VNFs, CNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, CNFs, etc., that receive, store, and/or provide information that may be used in determining parameters (e.g., quality of service parameters, charging parameters, or the like) for certain applications.

UPF/PGW-U 1335 may include one or more devices, systems, VNFs, CNFs, etc., that receive, store, and/or provide data (e.g., user plane data). For example, UPF/PGW-U 1335 may receive user plane data (e.g., voice call traffic, data traffic, etc.), destined for UE 101, from DN 1350, and may forward the user plane data toward UE 101 (e.g., via RAN 1310, SMF/PGW-C 1320, and/or one or more other devices). In some embodiments, multiple instances of UPF/PGW-U 1335 may be deployed (e.g., in different geographical locations), and the delivery of content to UE 101 may be coordinated via the N9 interface (e.g., as denoted in FIG. 13 by the line marked "N9" originating and terminating at UPF/PGW-U 1335). Similarly, UPF/PGW-U 1335 may receive traffic from UE 101 (e.g., via RAN 1310, RAN 1312, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

UDM/HSS 1340 and AUSF 1345 may include one or more devices, systems, VNFs, CNFs, etc., that manage, update, and/or store, in one or more memory devices associated with AUSF 1345 and/or UDM/HSS 1340, profile information associated with a subscriber. In some embodiments, UDM/HSS 1340 may include, may implement, may be communicatively coupled to, and/or may otherwise be associated with some other type of repository or database, such as a Unified Data Repository ("UDR"). AUSF 1345 and/or UDM/HSS 1340 may perform authentication, authorization, and/or accounting operations associated with one or more UEs 101 and/or one or more communication sessions associated with one or more UEs 101.

DN 1350 may include one or more wired and/or wireless networks. For example, DN 1350 may include an Internet Protocol ("IP")-based PDN, a wide area network ("WAN") such as the Internet, a private enterprise network, and/or one or more other networks. UE 101 may communicate, through DN 1350, with data servers, other UEs 101, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 101 may communicate.

External devices 1354 may include one or more devices or systems that communicate with UE 101 via 1350 and one or more elements of 1300 (e.g., via UPF/PGW-U 1335). In some embodiments, external device 1354 may include, may implement, and/or may otherwise be associated with QMS 301. External devices 1354 may include, for example, one or more application servers, content provider systems, web servers, or the like. External devices 1354 may, for example, implement "server-side" applications that communicate with "client-side" applications executed by UE 101. External devices 1354 may provide services to UE 101 such as gaming services, video conferencing services, messaging services, email services, web services, and/or other types of services.

In some embodiments, external devices 1354 may communicate with one or more elements of environment 1300 (e.g., core network elements) via NEF/SCEF 1349. NEF/SCEF 1349 include one or more devices, systems, VNFs, CNFs, etc. that provide access to information, APIs, and/or other operations or mechanisms of one or more core network elements to devices or systems that are external to the core network (e.g., to external device 1354 via DN 1350). NEF/SCEF 1349 may maintain authorization and/or authentication information associated with such external devices or systems, such that NEF/SCEF 1349 is able to provide information, that is authorized to be provided, to the external devices or systems. For example, a given external device 1354 may request particular information associated with one or more core network elements. NEF/SCEF 1349 may authenticate the request and/or otherwise verify that external device 1354 is authorized to receive the information, and may request, obtain, or otherwise receive the information from the one or more core network elements. In some embodiments, NEF/SCEF 1349 may include, may implement, may be implemented by, may be communicatively coupled to, and/or may otherwise be associated with a Security Edge Protection Proxy ("SEPP"), which may perform some or all of the functions discussed above. External device 1354 may, in some situations, subscribe to particular types of requested information provided by the one or more core network elements, and the one or more core network elements may provide (e.g., "push") the requested information to NEF/SCEF 1349 (e.g., in a periodic or otherwise ongoing basis).

In some embodiments, external devices 1354 may communicate with one or more elements of RAN 1310 and/or 1312 via an API or other suitable interface. For example, a given external device 1354 may provide instructions, requests, etc. to RAN 1310 and/or 1312 to provide one or more services via one or more respective MECs 1314. In some embodiments, such instructions, requests, etc. may include QoS parameters, Service Level Agreements ("SLAs"), etc. (e.g., maximum latency thresholds, minimum throughput thresholds, etc.) associated with the services.

Figure 14:
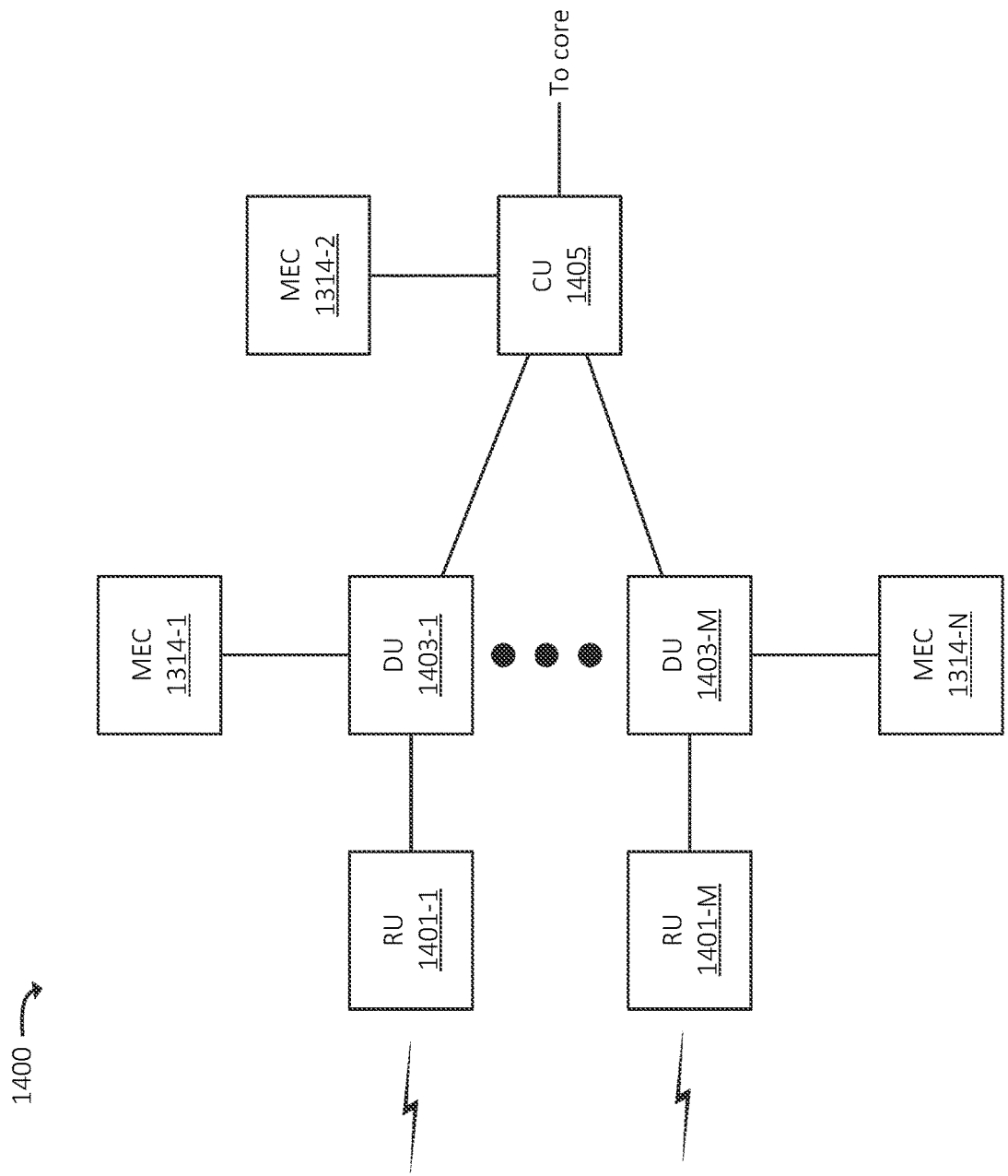
FIG. 14 illustrates an example arrangement of a radio access network ("RAN"), in accordance with some embodiments.

FIG. 14 illustrates an example RAN environment 1400, which may be included in and/or implemented by one or more RANs (e.g., RAN 1310 or some other RAN). In some embodiments, a particular RAN 1310 may include one RAN environment 1400. In some embodiments, a particular RAN 1310 may include multiple RAN environments 1400. In some embodiments, RAN environment 1400 may correspond to a particular gNB 1311 of RAN 1310. In some embodiments, RAN environment 1400 may correspond to multiple gNBs 1311. In some embodiments, RAN environment 1400 may correspond to one or more other types of base stations of one or more other types of RANs. As shown, RAN environment 1400 may include Central Unit ("CU") 1405, one or more Distributed Units ("DUs") 1403-1 through 1403-M (referred to individually as "DU 1403," or collectively as "DUs 1403"), and one or more Radio Units ("RUs") 1401-1 through 1401-M (referred to individually as "RU 1401," or collectively as "RUs 1401").

CU 1405 may communicate with a core of a wireless network (e.g., may communicate with one or more of the devices or systems described above with respect to FIG. 13, such as AMF 1315 and/or UPF/PGW-U 1335) and/or some other device or system such as MEC 1314. In the uplink direction (e.g., for traffic from UEs 101 to a core network), CU 1405 may aggregate traffic from DUs 1403, and forward the aggregated traffic to the core network. In some embodiments, CU 1405 may receive traffic according to a given protocol (e.g., Radio Link Control ("RLC") traffic) from DUs 1403, and may perform higher-layer processing (e.g., may aggregate/process RLC packets and generate Packet Data Convergence Protocol ("PDCP") packets based on the RLC packets) on the traffic received from DUs 1403.

CU 1405 may receive downlink traffic (e.g., traffic from the core network, traffic from a given MEC 1314, etc.) for a particular UE 101, and may determine which DU(s) 1403 should receive the downlink traffic. DU 1403 may include one or more devices that transmit traffic between a core network (e.g., via CU 1405) and UE 101 (e.g., via a respective RU 1401). DU 1403 may, for example, receive traffic from RU 1401 at a first layer (e.g., physical ("PHY") layer traffic, or lower PHY layer traffic), and may process/aggregate the traffic to a second layer (e.g., upper PHY and/or RLC). DU 1403 may receive traffic from CU 1405 at the second layer, may process the traffic to the first layer, and provide the processed traffic to a respective RU 1401 for transmission to UE 101.

RU 1401 may include hardware circuitry (e.g., one or more RF transceivers, antennas, radios, and/or other suitable hardware) to communicate wirelessly (e.g., via an RF interface) with one or more UEs 101, one or more other DUs 1403 (e.g., via RUs 1401 associated with DUs 1403), and/or any other suitable type of device. In the uplink direction, RU 1401 may receive traffic from UE 101 and/or another DU 1403 via the RF interface and may provide the traffic to DU 1403. In the downlink direction, RU 1401 may receive traffic from DU 1403, and may provide the traffic to UE 101 and/or another DU 1403.

One or more elements of RAN environment 1400 may, in some embodiments, be communicatively coupled to one or more MECs 1314. For example, DU 1403-1 may be communicatively coupled to MEC 1314-1, DU 1403-M may be communicatively coupled to MEC 1314-N, CU 1405 may be communicatively coupled to MEC 1314-2, and so on. MECs 1314 may include hardware resources (e.g., configurable or provisionable hardware resources) that may be configured to provide services and/or otherwise process traffic to and/or from UE 101, via a respective RU 1401.

For example, DU 1403-1 may route some traffic, from UE 101, to MEC 1314-1 instead of to a core network via CU

1405. MEC 1314-1 may process the traffic, perform one or more computations based on the received traffic, and may provide traffic to UE 101 via RU 1401-1. As discussed above, MEC 1314 may include, and/or may implement, some or all of the functionality described above with respect to QAI 105, UPF/PGW-U 1335, AF 1330, and/or one or more other devices, systems, VNFs, CNFs, etc. In this manner, ultra-low latency services may be provided to UE 101, as traffic does not need to traverse DU 1403, CU 1405, links between DU 1403 and CU 1405, and an intervening backhaul network between RAN environment 1400 and the core network.

Figure 15:
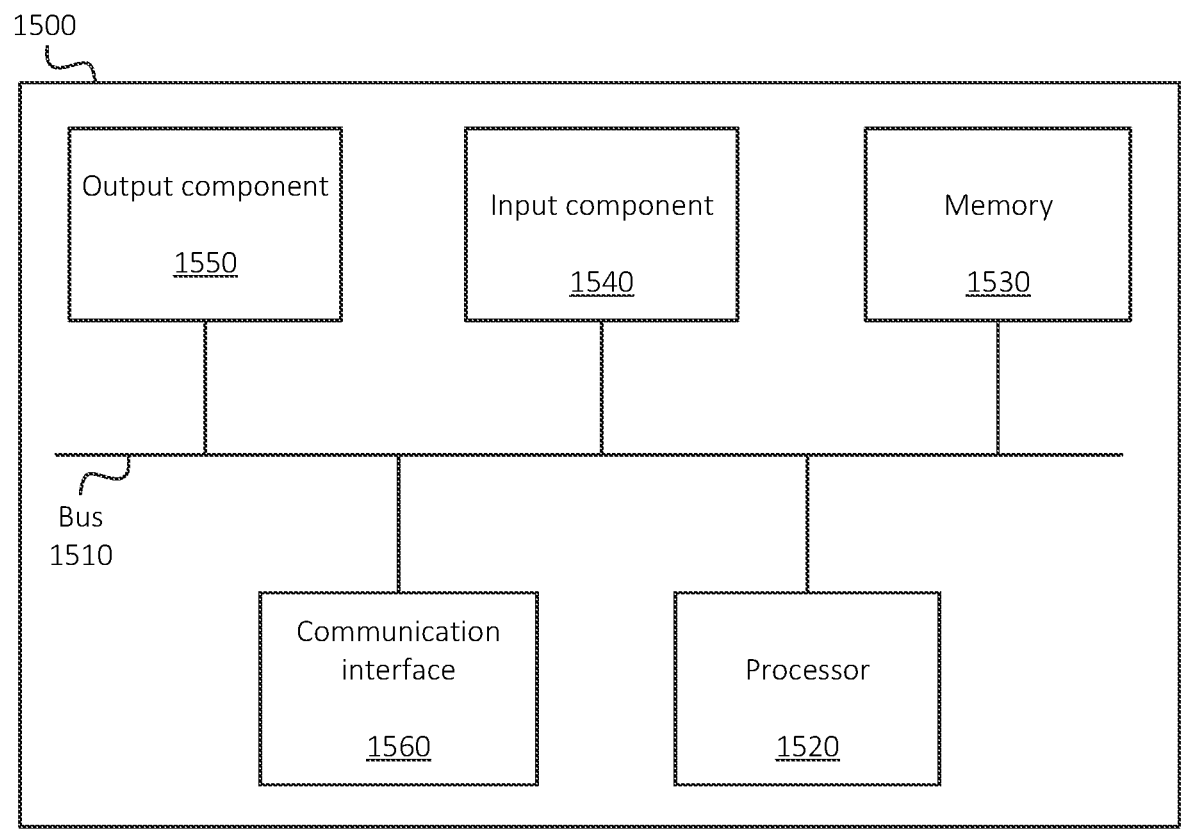
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, a set of provisioned hardware resources of a cloud computing system, or other suitable type of hardware that interprets and/or executes instructions (e.g., processor-executable instructions). In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to input component 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems (e.g., via RAN 1310, RAN 1312, DN 1350, etc.). For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1500 may include more than one communication interface 1560. For instance, device 1500 may include an optical interface, a wireless interface, an Ethernet interface, and/or one or more other interfaces.

Device 1500 may perform certain operations relating to one or more processes described above. Device 1500 may perform these operations in response to processor 1520 executing instructions, such as software instructions, processor-executable instructions, etc. stored in a computer-readable medium, such as memory 1530. A computer-readable medium may be defined as a non-transitory memory device. A memory device may include space within a single physical memory device or spread across multiple physical memory devices. The instructions may be read into memory 1530 from another computer-readable medium or from another device. The instructions stored in memory 1530 may be processor-executable instructions that cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain one or more models associating sets of traffic attributes with respective sets of attributes of user interface ("UI") elements;
receive a first request to associate a first UI element of a UI, associated with an application executing at a User Equipment ("UE"), with a first set of Quality of Service ("QoS") parameters;
receive a second request to associate a second UI element of the UI, associated with the application executing at the UE, with a second set of QoS parameters;
identify a first set of attributes of the first UI element indicated in the first request;
identify a second set of attributes of the second UI element indicated in the second request;
identify that the first set of attributes, of the first UI element, matches a third set of attributes of UI elements included in the one or more models;
identify that the second set of attributes, of the second UI element, matches a fourth set of attributes of UI elements included in the one or more models;
identify a first set of traffic attributes indicated in the one or more models as being associated with the third set of attributes;
identify a second set of traffic attributes indicated in the one or more models as being associated with the fourth set of attributes;
identify first traffic, that is associated with the first set of traffic attributes and that is further associated with the first UI element associated with the application executing at the UE;
process the first traffic in accordance with the first set of QOS parameters indicated in the first request, based on identifying that the first traffic is associated with the first set of traffic attributes;
identify second traffic, that is associated with the second set of traffic attributes and that is further associated with the second UI element associated with the application executing at the UE; and
process the second traffic in accordance with the second set of QoS parameters indicated in the second request, based on identifying that the second traffic is associated with the second set of traffic attributes.

2. The device of claim 1, wherein the first and second traffic are associated with the same application.

3. The device of claim 1, wherein the first set of traffic attributes includes at least one of:
a Fully Qualified Domain Name ("FQDN") associated with an endpoint with which the first traffic is associated, or a protocol associated with the first traffic.

4. The device of claim 1, wherein the first and second sets of QoS parameters include at least one of:
one or more network slice identifiers, or
one or more UE Route Selection Policy ("URSP") rule identifiers.

5. The device of claim 1,
wherein receiving the request to associate the first UI element with the first set of QoS parameters includes an image depicting the first UI element, and
wherein identifying the first set of attributes of the first UI element includes utilizing one or more image recognition techniques to identify the first set of attributes of the first UI element.

6. The device of claim 1, wherein processing the first traffic in accordance with the first set of QOS parameters includes:
marking the first traffic with one or more indicators of the first set of QoS parameters; and
forwarding the marked first traffic to a network, wherein the network further processes the marked first traffic in accordance with the first set of QoS parameters based on the marking.

7. The device of claim 1, wherein the first UI element includes a first button presented via the UI associated with the application, and wherein the second UI element includes a second button presented via the UI associated with the application.

8. A non-transitory computer-readable medium, storing a plurality of processor-executable instructions to:
maintain one or more models associating sets of traffic attributes with respective sets of attributes of user interface ("UI") elements;
receive a first request to associate a first UI element of a UI, associated with an application executing at a User Equipment ("UE"), with a first set of Quality of Service ("QoS") parameters;
receive a second request to associate a second UI element of the UI, associated with the application executing at the UE, with a second set of QoS parameters;
identify a first set of attributes of the first UI element indicated in the first request;
identify a second set of attributes of the second UI element indicated in the second request;
identify that the first set of attributes, of the first UI element, matches a third set of attributes of UI elements included in the one or more models;

identify that the second set of attributes, of the second UI element, matches a fourth set of attributes of UI elements included in the one or more models;
identify a first set of traffic attributes indicated in the one or more models as being associated with the third set of attributes;
identify a second set of traffic attributes indicated in the one or more models as being associated with the fourth set of attributes;
identify first traffic, that is associated with the first set of traffic attributes and that is further associated with the first UI element associated with the application executing at the UE;
process the first traffic in accordance with the first set of QoS parameters indicated in the first request, based on identifying that the first traffic is associated with the first set of traffic attributes;
identify second traffic, that is associated with the second set of traffic attributes and that is further associated with the second UI element associated with the application executing at the UE; and
process the second traffic in accordance with the second set of QoS parameters indicated in the second request, based on identifying that the second traffic is associated with the second set of traffic attributes.

9. The non-transitory computer-readable medium of claim 8, wherein the first and second traffic are associated with the same application.

10. The non-transitory computer-readable medium of claim 8, wherein the first set of traffic attributes includes at least one of:
a Fully Qualified Domain Name ("FQDN") associated with an endpoint with which the first traffic is associated, or
a protocol associated with the first traffic.

11. The non-transitory computer-readable medium of claim 8, wherein the first and second sets of QOS parameters include at least one of:
one or more network slice identifiers, or
one or more UE Route Selection Policy ("URSP") rule identifiers.

12. The non-transitory computer-readable medium of claim 8,
wherein receiving the request to associate the first UI element with the first set of QoS parameters includes an image depicting the first UI element, and
wherein identifying the first set of attributes of the first UI element includes utilizing one or more image recognition techniques to identify the first set of attributes of the first UI element.

13. The non-transitory computer-readable medium of claim 8, wherein processing the first traffic in accordance with the first set of QoS parameters includes:
marking the first traffic with one or more indicators of the first set of QoS parameters; and
forwarding the marked first traffic to a network, wherein the network further processes the marked first traffic in accordance with the first set of QOS parameters based on the marking.

14. The non-transitory computer-readable medium of claim 8, wherein the first UI element includes a first button presented via the UI associated with the application, and wherein the second UI element includes a second button presented via the UI associated with the application.

15. A method, comprising:
maintaining one or more models associating sets of traffic attributes with respective sets of attributes of user interface ("UI") elements;
receiving a first request to associate a first UI element of a UI, associated with an application executing at a User Equipment ("UE"), with a first set of Quality of Service ("QoS") parameters;
receiving a second request to associate a second UI element of the UI, associated with the application executing at the UE, with a second set of QoS parameters;
identifying a first set of attributes of the first UI element indicated in the first request;
identifying a second set of attributes of the second UI element indicated in the second request;
identifying that the first set of attributes, of the first UI element, matches a third set of attributes of UI elements included in the one or more models;
identifying that the second set of attributes, of the second UI element, matches a fourth set of attributes of UI elements included in the one or more models;
identifying a first set of traffic attributes indicated in the one or more models as being associated with the third set of attributes of UI element attributes;
identifying a second set of traffic attributes indicated in the one or more models as being associated with the fourth set of attributes;
identifying first traffic, that is associated with the first set of traffic attributes and that is further associated with the first UI element associated with the application executing at the UE;
processing the first traffic in accordance with the first set of QoS parameters indicated in the first request, based on identifying that the first traffic is associated with the first set of traffic attributes;
identifying second traffic, that is associated with the second set of traffic attributes and that is further associated with the second UI element associated with the application executing at the UE; and
processing the second traffic in accordance with the second set of QoS parameters indicated in the second request, based on identifying that the second traffic is associated with the second set of traffic attributes.

16. The method of claim 15, wherein the first and second traffic are associated with the same application.

17. The method of claim 15,
wherein the first set of traffic attributes includes at least one of:
a Fully Qualified Domain Name ("FQDN") associated with an endpoint with which the first traffic is associated, or
a protocol associated with the first traffic; and
wherein the first and second sets of QoS parameters include at least one of:
one or more network slice identifiers, or
one or more UE Route Selection Policy ("URSP") rule identifiers.

18. The method of claim 15,
wherein receiving the request to associate the first UI element with the first set of QOS parameters includes an image depicting the first UI element, and
wherein identifying the first set of attributes of the first UI element includes utilizing one or more image recognition techniques to identify the first set of attributes of the first UI element.

19. The method of claim 15, wherein processing the first traffic in accordance with the first set of QoS parameters includes:
- marking the first traffic with one or more indicators of the first set of QoS parameters; and
- forwarding the marked first traffic to a network, wherein the network further processes the marked first traffic in accordance with the first set of QoS parameters based on the marking.

20. The method of claim 15, wherein the first UI element includes a first button presented via the UI associated with the application, and wherein the second UI element includes a second button presented via the UI associated with the application.

* * * * *